US012460714B2

United States Patent
Tamura et al.

(10) Patent No.: US 12,460,714 B2
(45) Date of Patent: Nov. 4, 2025

(54) METHOD AND DEVICE FOR SEALING GREASE INTO BALL SCREW DEVICE, BALL SCREW DEVICE, METHOD FOR PRODUCING BALL SCREW DEVICE, METHOD FOR PRODUCING LINEAR ACTUATOR, METHOD FOR PRODUCING VEHICLE BRAKE, AND METHOD FOR PRODUCING VEHICLE

(71) Applicant: NSK LTD., Tokyo (JP)

(72) Inventors: Ryo Tamura, Fujisawa (JP); Kouhei Dobashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/016,156

(22) PCT Filed: Aug. 23, 2021

(86) PCT No.: PCT/JP2021/030822
§ 371 (c)(1),
(2) Date: Jan. 13, 2023

(87) PCT Pub. No.: WO2022/045070
PCT Pub. Date: Mar. 3, 2022

(65) Prior Publication Data
US 2023/0279941 A1 Sep. 7, 2023

(30) Foreign Application Priority Data
Aug. 24, 2020 (JP) .................................. 2020-141099

(51) Int. Cl.
*F16H 57/04* (2010.01)
*F16D 65/14* (2006.01)
(Continued)

(52) U.S. Cl.
CPC ......... *F16H 57/0408* (2013.01); *F16D 65/14* (2013.01); *F16H 25/2204* (2013.01);
(Continued)

(58) Field of Classification Search
CPC ............. F16H 25/2204; F16H 57/0497; F16H 57/0464; F16H 25/2018; F16H 57/0463;
(Continued)

(56) References Cited

U.S. PATENT DOCUMENTS 3,132,719 A * 5/1964 Cole ................... F16H 25/2204
184/101
4,905,533 A * 3/1990 Benton ............... F16H 25/2418
277/354

(Continued)

FOREIGN PATENT DOCUMENTS

JP  2002-530597 A  9/2002
JP  2002-340131 A  11/2002
(Continued)

OTHER PUBLICATIONS

Japanese Office Action dated Apr. 5, 2022 in Japanese Application No. 2021-577186.
(Continued)

*Primary Examiner* — Henry Y Liu
(74) *Attorney, Agent, or Firm* — Sughrue Mion, PLLC

(57) ABSTRACT

A grease filling method for a ball screw device includes the steps of covering an outer periphery of a screw shaft protruding from one end portion of a nut with a covering member, supplying grease to a portion between a nut inner peripheral surface on one end portion side of the nut and the screw shaft, inserting the protruding screw shaft into a nut inner side while being covered with the covering member, bringing a tip of the covering member in an insertion direction closer to an end portion of an infinite circulation (Continued)

path on the one end portion side of the nut, and sending the grease supplied to the nut inner side to a region of the infinite circulation path, pulling out the covering member together with the screw shaft from the one end portion of the nut, and taking out the covering member from the screw shaft.

17 Claims, 17 Drawing Sheets

(51) Int. Cl.
  *F16D 125/40* (2012.01)
  *F16H 25/22* (2006.01)
(52) U.S. Cl.
  CPC ..... *F16H 57/0464* (2013.01); *F16H 57/0497* (2013.01); *F16D 2125/40* (2013.01)
(58) Field of Classification Search
  CPC ............. F16H 57/0456; F16H 57/0434; F16H 57/0436; F16H 57/0408; F16D 2125/40
  USPC ................................... 184/5, 15.2; 74/89.44
  See application file for complete search history.

(56) References Cited

U.S. PATENT DOCUMENTS

| | | | | | |
|---|---|---|---|---|---|
| 5,014,568 | A * | 5/1991 | Schlenker | ........... | F16H 25/2214 74/424.86 |
| 5,168,767 | A * | 12/1992 | Morita | ................ | F16H 25/2204 74/89.44 |
| 5,228,353 | A * | 7/1993 | Katahira | ............. | F16H 25/2204 74/89.3 |
| 5,749,266 | A * | 5/1998 | Tsukada | ............. | F16C 33/6622 74/89.44 |
| 5,782,135 | A * | 7/1998 | Kondo | ................ | F16C 33/6696 74/89.44 |
| 6,015,775 | A * | 1/2000 | Takayama | ........... | F16C 33/1095 508/108 |
| 6,023,991 | A * | 2/2000 | Yabe | .................... | F16H 57/0497 74/89.44 |
| 6,216,821 | B1 | 4/2001 | Namimatsu | ......... | F16H 25/2418 184/99 |
| 6,247,556 | B1 * | 6/2001 | Chen | ................... | F16H 57/0497 184/102 |
| 6,339,049 | B1 * | 1/2002 | Funahashi | ............ | C10M 101/02 508/320 |
| 6,568,508 | B2 * | 5/2003 | West | ................... | F16H 57/0497 184/5 |
| 6,607,059 | B1 * | 8/2003 | Kapaan | .................. | F16D 65/18 384/477 |
| 6,619,148 | B2 * | 9/2003 | Nishide | ............... | F16H 57/0497 184/5 |
| 6,691,837 | B1 * | 2/2004 | Kapaan | .................. | F16D 65/18 74/89.44 |
| 7,234,368 | B1 * | 6/2007 | Lin | ..................... | F16H 25/2214 74/89.44 |
| 8,387,474 | B2 * | 3/2013 | Lin | ..................... | F16C 33/6659 74/89.44 |
| 8,544,356 | B2 * | 10/2013 | Asakura | .............. | F16H 25/2214 180/444 |
| 8,893,570 | B2 * | 11/2014 | Chuo | .................. | F16H 57/0497 184/5 |
| 8,931,358 | B2 * | 1/2015 | Chang | ................. | F16H 25/2214 74/89.3 |
| 8,935,967 | B2 * | 1/2015 | Chen | ................... | F16H 25/2214 74/424.83 |
| 9,759,311 | B2 * | 9/2017 | Chu | .................... | F16H 57/0497 |
| 9,784,363 | B2 * | 10/2017 | Chen | .................. | F16H 57/0497 |
| 10,267,408 | B2 * | 4/2019 | Kang | .................. | F16H 25/2204 |
| 10,520,069 | B2 * | 12/2019 | Yang | ....................... | F16H 25/22 |
| 10,619,672 | B2 * | 4/2020 | Lin | .......................... | F16C 29/04 |
| 11,236,815 | B2 * | 2/2022 | Somerfield | ......... | F16H 25/2418 |
| 11,287,020 | B2 * | 3/2022 | Trézières | ............ | F16H 25/2204 |
| 11,835,116 | B1 * | 12/2023 | Yu | ....................... | F16H 25/2214 |
| 2002/0170369 | A1 * | 11/2002 | Yabe | ................... | F16H 25/2204 74/89.44 |
| 2005/0252324 | A1 * | 11/2005 | Kato | .................. | F16H 25/2204 74/89.44 |
| 2005/0255186 | A1 * | 11/2005 | Hiraga | .................... | B29C 45/83 74/89.44 |
| 2009/0007710 | A1 * | 1/2009 | Takahashi | ........... | F16C 33/3706 74/424.82 |
| 2012/0240706 | A1 * | 9/2012 | Ohkubo | .............. | F16H 25/2418 74/424.82 |
| 2014/0321776 | A1 * | 10/2014 | Hosoya | ................... | F16C 29/06 384/13 |
| 2015/0377342 | A1 * | 12/2015 | Chu | .................... | F16H 57/0464 74/424.81 |
| 2017/0002680 | A1 * | 1/2017 | Tonaka | ................... | F01D 25/24 |
| 2017/0146114 | A1 * | 5/2017 | Chen | ..................... | F16H 57/045 |
| 2018/0259073 | A1 * | 9/2018 | Ootani | .................... | F16H 25/24 |
| 2018/0283511 | A1 * | 10/2018 | Tashiro | ............... | F16H 25/2238 |
| 2019/0078681 | A1 * | 3/2019 | Lin | ...................... | F16C 29/0695 |
| 2019/0329815 | A1 * | 10/2019 | Illés | ....................... | B62D 5/0448 |
| 2020/0003286 | A1 * | 1/2020 | Sun | ..................... | F16H 25/2219 |
| 2020/0362947 | A1 * | 11/2020 | Castell | ................ | F16H 25/2015 |
| 2020/0408290 | A1 * | 12/2020 | Kubota | ................ | F16J 15/3268 |
| 2022/0090661 | A1 * | 3/2022 | Fukui | ........................ | D04B 1/02 |
| 2023/0107810 | A1 * | 4/2023 | Mellor | ................ | F16H 25/2233 74/424.86 |

FOREIGN PATENT DOCUMENTS

| | | |
|---|---|---|
| JP | 2015-31322 A | 2/2015 |
| JP | 2018-168909 A | 11/2018 |
| JP | 2019-210996 A | 12/2019 |

OTHER PUBLICATIONS

Japanese Office Action dated Jul. 26, 2022 in Japanese Application No. 2021-577186.
International Search Report (PCT/ISA/210) dated Nov. 2, 2021 in corresponding International Application No. PCT/JP2021/030822.
Written Opinion (PCT/ISA/237) dated Nov. 2, 2021 in corresponding International Application No. PCT/JP2021/030822.

* cited by examiner

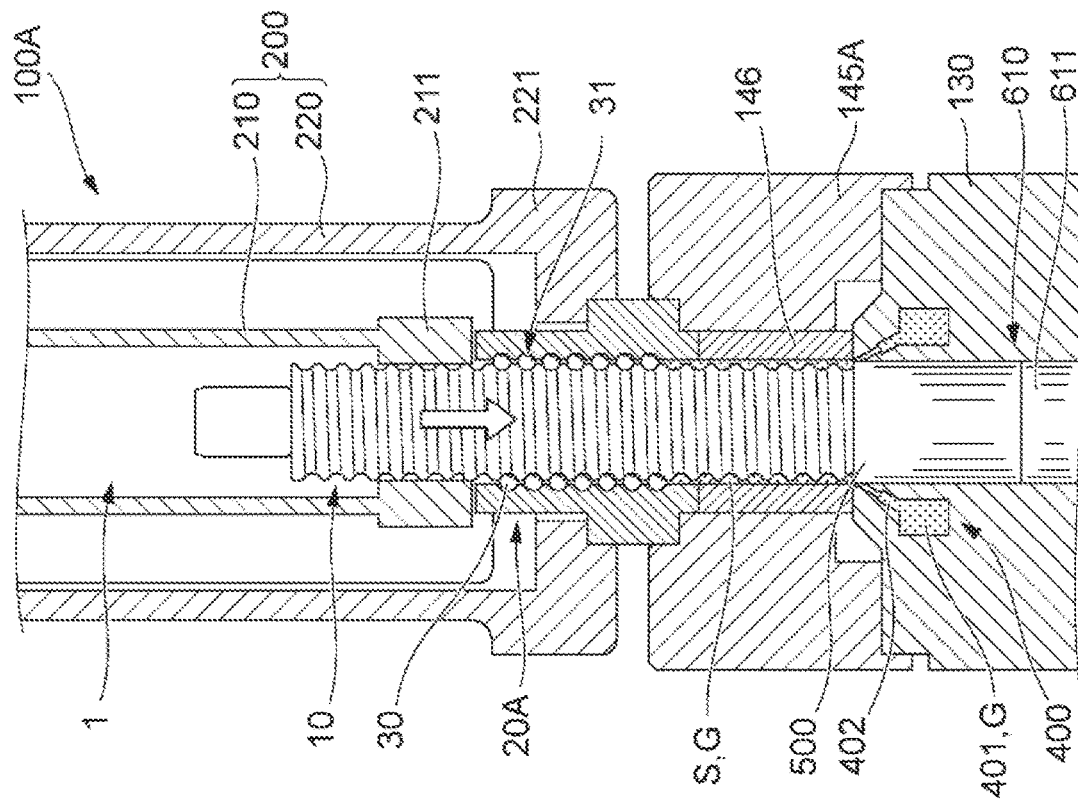
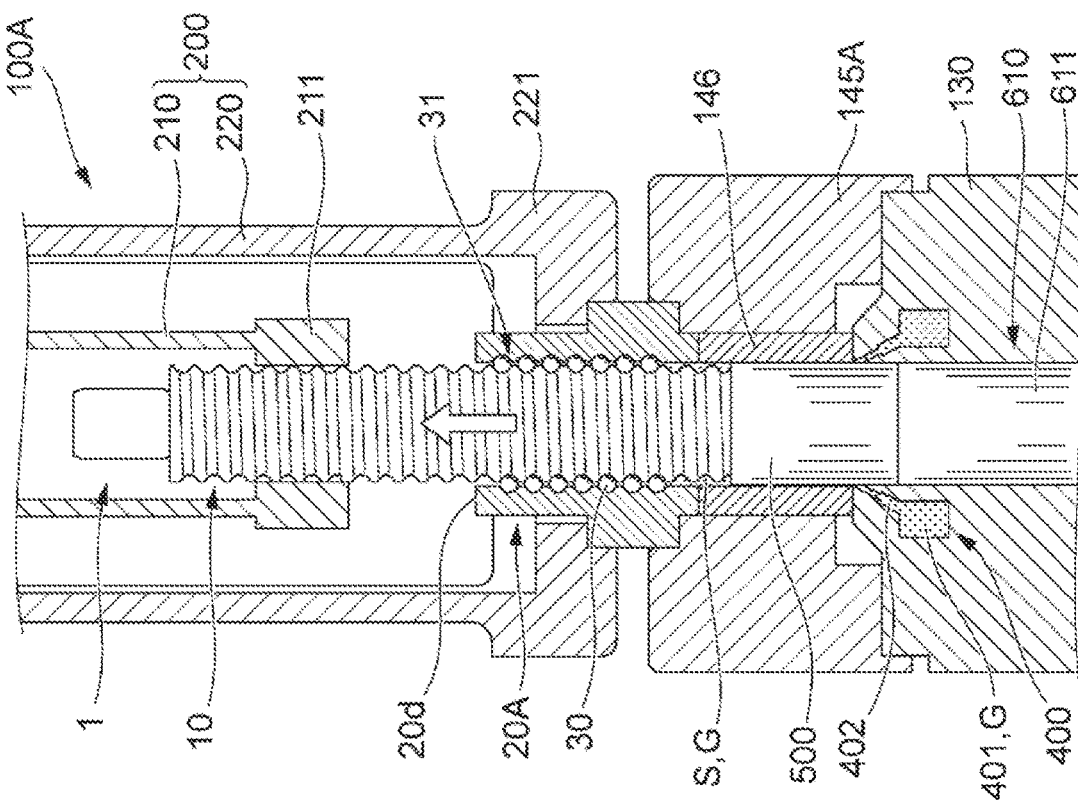

METHOD AND DEVICE FOR SEALING GREASE INTO BALL SCREW DEVICE, BALL SCREW DEVICE, METHOD FOR PRODUCING BALL SCREW DEVICE, METHOD FOR PRODUCING LINEAR ACTUATOR, METHOD FOR PRODUCING VEHICLE BRAKE, AND METHOD FOR PRODUCING VEHICLE

CROSS-REFERENCE TO RELATED APPLICATIONS

This application is a National Phase Entry of PCT International Application No. PCT/JP2021/030822, filed on Aug. 23, 2021, which claims priority to Japanese Patent Application No. 2020-141099 filed on Aug. 24, 2020, the contents of all of which are incorporated herein by reference in their entirety.

TECHNICAL FIELD

The present invention relates to a grease filling method and a grease filling device for a ball screw device, as well as a ball screw device, a ball screw device manufacturing method, a linear actuator manufacturing method, a vehicle brake manufacturing method, and a vehicle manufacturing method.

BACKGROUND ART

A ball screw device is widely used as a component which makes it possible to move a screw shaft and a nut with a light force by arranging a plurality of halls between the screw shaft and the nut. The ball screw device requires a lubricant between the screw shaft and the nut, and therefore, a technique of applying grease to a portion where the plurality of balls are arranged is known (Patent Literature 1).

Patent Literature 1 describes a linear actuator including a screw shaft, a nut, a plurality of balls arranged between the screw shaft and the nut, and a housing attached to the nut. When lubricating this linear actuator, grease is provided on a bottom portion side in the housing before attaching an assembly in which the screw shaft and the nut are integrated to the housing. Then, after attaching the assembly to the housing, the screw shaft is rotated and an end portion of the screw shaft is advanced toward the bottom portion of the housing to approach the bottom portion of the housing. As a result, the end portion of the screw shaft pushes out the grease, causing the grease to enter a trajectory path between the screw shaft and the nut.

CITATION LIST

Patent Literature

Patent Literature 1: JP-A-2018-168909

SUMMARY OF INVENTION

Technical Problem

The lubricant application method for a linear actuator in Patent Literature 1 is an application method in which a ball screw is assembled to the housing and grease is transferred to the trajectory path. However, grease may also be extruded and be applied to an exposed portion of the screw shaft that is exposed from the housing without the nut being fitted externally. Therefore, in a product assembled state, dust, foreign matter, or the like tend to adhere to the grease of the exposed portion, resulting in poor appearance. Also, to press the grease with an end portion of the screw shaft to allow the grease to enter a gap between the screw shaft and the nut, when a pressing force is small or viscosity of the grease is high, the grease does not always reach the trajectory path where the ball intervenes. When the grease does not reach, a grease supply amount can be increased, but there is a possibility that problems will occur due to grease extrusion from a nut end surface on an opposite side to a grease feed side.

Supply of the lubricant in Patent Literature 1 is a method of transferring grease to the trajectory path in a process of assembling the housing to the assembly of the ball screw shaft and the nut. Therefore, a process of applying grease and a process of assembling the housing cannot be separated for each product, and thus a degree of freedom in step setting is restricted. In addition, since it is not possible to apply grease only to the trajectory path, the supply of the lubricant in Patent Literature 1 cannot be applied to a wide variety of products. Since the grease is transferred by using a clearance to the trajectory path inside the nut, it is not possible to complete the application with a minimum required amount of grease. Further, when changing a grease application amount, it is presumed that it is necessary to reset the clearance with the housing to make the grease reach the trajectory path, and thus it is not easy to change the grease application amount. Similarly, the grease extrusion from the nut end surface cannot be easily changed because the grease extrusion is adjusted by the clearance with the housing.

Therefore, an object of the invention is to provide a grease filling method and a urease filling device for a ball screw device, as well as a ball screw device, a ball screw device manufacturing method, a linear actuator manufacturing method, a vehicle brake manufacturing method, and a vehicle manufacturing method which can accurately and reliably supply grease supplied to a nut inner side to a desired position in the nut inner side while suppressing adhesion to a screw shaft protruding from the nut.

Solution to Problem

The invention has the following configurations.

(1) A grease filling method for a ball screw device which applies grease to an infinite circulation path of a nut in a ball screw device including a screw shaft with a first thread groove formed on an outer peripheral surface, the nut placed around the screw shaft and having a second thread groove formed on an inner peripheral surface, a plurality of balls arranged in a rolling path between the first thread groove and the second thread groove, and the infinite circulation path which returns the ball from one part of the rolling path to another part, the method including the steps of
covering an outer periphery of the screw shaft protruding from one end portion of the nut with a covering member;
supplying the grease to a gap between a nut inner peripheral surface on one end side of the nut and the screw shaft;
inserting the protruding screw shaft into a nut inner side while being covered with the covering member by relatively rotating the screw shaft and the nut, bringing a tip of the covering member in an insertion direction closer to an end portion of the infinite circulation path on the one end portion side of the nut, and sending the grease supplied to the nut inner side to a region of the infinite circulation path;

pulling out the covering member together with the screw shaft from the one end portion of the nut by relatively rotating the screw shaft and the nut in a direction opposite to a direction of the relative rotation; and taking out the covering member from the screw shaft.

(2) A grease filling method for a ball screw device which applies grease to an infinite circulation path of a nut in a ball screw device including a screw shaft with a first thread groove formed on an outer peripheral surface, the nut placed around the screw shaft and having a second thread groove formed on an inner peripheral surface, a plurality of balls arranged in a rolling path between the first thread groove and the second thread groove, and the infinite circulation path which returns the ball from one part of the rolling path to another part, the method including:

a support step of covering an outer periphery of the screw shaft protruding from one end portion of the nut with a covering member and supporting one end side of the nut by a support unit via the covering member;

a grease pressure-feeding step of pressure-feeding grease toward a nut inner side from a gap between a nut inner peripheral surface on the one end side of the nut and the screw shaft;

a grease transfer step of inserting the protruding screw shaft into the nut inner side while being covered with the covering member by relatively rotating the screw shall and the nut, making a tip of the covering member in an insertion direction reach a position of the infinite circulation path of the nut, and sending the grease supplied to the nut inner side to the infinite circulation path;

a return step of relatively rotating the screw shaft and the nut in a direction opposite to a direction of the relative rotation and pulling out the covering member from the one end portion of the nut as the screw shaft moves; and a taking out step of taking out the ball screw device from the support unit and removing the covering member from the screw shaft.

According to the above-described grease filling method for the ball screw device, by covering the outer periphery of the screw shaft protruding from the one end portion of the nut with the covering member, supplying the grease to the nut inner side in this state, and moving the screw shaft together with the sleeve to the nut inner side, the grease at the nut inner side can be supplied to the infinite circulation path. In addition, it is possible to suppress adhesion of the grease to a portion of the screw shaft covered with the covering member.

(3) The grease filling method for the ball screw device according to (2), where the screw shaft is moved with respect to the nut by fixing the nut to the support unit and rotating the screw shaft.

According to this grease filling method for the ball screw device, the ball screw device can be supported more stably by setting the nut, which can be fixed more easily than the screw shaft, to the fixed side.

(4) The grease filling method for the ball screw device according to (2), where the screw shaft is moved with respect to the nut by making the screw shaft supported by the support unit so as to be movable in an axial direction and non-rotatable and rotating the nut.

According to this grease filling method for the ball screw device, the screw shaft can be rotationally driven with a lower torque than when the screw shaft is rotationally driven.

(5) The grease filling method for the ball screw device according to any one of (1) to (4), where the covering member is a sleeve having a side wall portion thinner than a difference between a maximum radius of the screw shaft and a minimum radius of the nut.

According to this grease filling method for the ball screw device, the grease is pressure-fed to the nut inner side through the thin side wall portion.

(6) The grease filling method for the ball screw device according to any one of (1) to (5), where at the one end portion of the nut, the grease is pressure-fed from a nozzle whose discharge direction is inclined from a radial direction of the screw shaft toward the nut inner side.

According to this grease filling method for the ball screw device, the grease is pressure-fed from the nozzle whose discharge direction is inclined, so that the grease can be efficiently supplied to the nut inner side.

(7) The grease filling method for the ball screw device according to (6), where the grease is pressure-fed from a plurality of the nozzles provided along a circumferential direction of the screw shaft.

According to this grease filling method for the ball screw device, the grease can be uniformly supplied along the circumferential direction of the nut inner side.

(8) The grease filling method for the ball screw device according to (6) or (7), where the covering member inserted into the nut inner side has a small diameter portion with a diameter-reduced outer peripheral surface in a region from a position facing a discharge port of the nozzle to the tip in the insertion direction and the grease is supplied to the nut inner side through the small diameter portion.

According to this grease filling method for the ball screw device, the grease is supplied to the gap formed between the outer peripheral surface of the small diameter portion and the inner peripheral surface of the nut and it becomes difficult for the grease to flow to a region other than the small diameter portion where the gap is small. This allows the grease to be selectively pressure-fed toward the nut inner side.

(9) The grease filling method for the ball screw device according to any one of (1) to (8), where the covering member has a bottomed tubular shape.

According to this grease filling method for the ball screw device, the end portion of the screw shaft can be reliably covered by a bottom of the covering member, and thus adhesion of the grease to the end portion of the screw shaft can be suppressed.

(10) A grease filling device for a ball screw device, in a ball screw device including a screw shaft with a first thread groove formed on an outer peripheral surface, a nut placed around the screw shaft and having a second thread groove formed on an inner peripheral surface, a plurality of balls arranged in a rolling path between the first thread groove and the second thread groove, and an infinite circulation path which returns the ball from one part of the rolling path to another part, the device including:

a covering member that covers an outer periphery of the screw shaft protruding from one end portion of the nut;

a grease supply unit that supplies grease to a gap between a nut inner peripheral surface on one end side of the nut and the screw shaft; and a grease transfer unit that inserts the protruding screw shaft into a nut inner side while being covered with the covering member by relatively rotating the screw shaft and the nut, brings a tip of the covering member in an insertion direction closer to an end portion of the infinite circulation path on the one end portion side of the nut, and transfers the grease supplied to the nut inner side to a region of the infinite circulation path, where the grease transfer unit pulls out the covering member together with the screw shaft from the one end portion of the nut by relatively rotating the screw shaft and the nut in a direction opposite to a direction of the relative rotation and takes out the covering member from the screw shaft.

(11) A grease filling device for a ball screw device which applies grease to an infinite circulation path of a nut in a ball screw device including a screw shaft with a first thread groove formed on an outer peripheral surface, the nut placed around the screw shaft and having a second thread groove formed on an inner peripheral surface, a plurality of balls arranged in a rolling path between the first thread groove and the second thread groove, and the infinite circulation path which returns the ball from one part of the rolling path to another part, the device including:

a covering member that covers the screw shaft protruding from one end portion of the nut;

a support unit that supports the one end portion of the nut via the covering member;

a grease supply unit that pressure-feeds the grease to a gap between a nut inner peripheral surface on one end side of the nut and the screw shaft; and a grease transfer unit which moves the covering member along an axial direction together with the screw shaft in synchronization with rotation by a rotation mechanism which relatively rotates the screw shaft and the nut and transfers the grease pressure-fed to the gap to the infinite circulation path of the nut, where the covering member is removed from the screw shaft when the ball screw device is taken out from the support unit.

According to this grease filling device for the ball screw device described above, the grease pressure-fed to the nut inner side can be transferred to the infinite circulation path by the movement of the covering member.

(12) The grease filling device for the ball screw device according to (11) where the grease transfer unit includes, a function of relatively rotating the screw shaft and the nut by the rotation mechanism, moving the protruding screw shaft to the nut inner side while being covered with the covering member, making a tip of the covering member in an insertion direction reach a position of the infinite circulation path of the nut, and sending the grease supplied to the nut inner side to the infinite circulation path, and a function of relatively rotating the screw shaft and the nut in a direction opposite to a direction of the relative rotation by the rotation mechanism and moving the covering member in a direction of coming out of the one end portion of the nut in synchronization with the movement of the screw shaft.

According to this grease filling device for the ball screw device, by covering an outer periphery of the screw shaft protruding from the one end portion of the nut with the covering member, supplying grease to the nut inner side in this state, and moving the screw shaft together with the covering member to the nut inner side, the grease at the nut inner side can be supplied to the infinite circulation path. In addition, it is possible to suppress adhesion of the grease to a portion of the screw shaft covered with the covering member.

(13) The grease filling device for the ball screw device according to (11) or (12), where the support unit fixes the nut, and the rotation mechanism rotates the screw shaft.

According to this grease filling device for the ball screw device, the ball screw device can be supported more stably by setting the nut, which can be fixed more easily than the screw shaft, to a fixed side.

(14) The grease filling device for the ball screw device according to (10) or (11), where the support unit supports the screw shaft so as to be movable in the axial direction and non-rotatable, and the rotation mechanism rotates the nut.

According to this grease filling device for the ball screw device, the screw shaft can be rotationally driven with a lower torque than when the screw shaft is rotationally driven.

(15) The grease filling device for the ball screw device according to any one of (11) to (14), where the support unit has a nozzle at the one end portion of the nut, in which a discharge direction is inclined from a radial direction of the screw shaft toward the nut inner side.

According to this grease filling device for the ball screw device, the grease is pressure-fed from the nozzle whose discharge direction is inclined, so that the grease can be efficiently supplied to the nut inner side.

(16) The grease filling device for the ball screw device according to (15), where a plurality of the nozzles are provided along a circumferential direction of the screw shaft.

According to this grease filling device for the ball screw device, the grease can be uniformly supplied along the circumferential direction of the nut inner side.

(17) The grease filling device for the ball screw device according to (15) or (16), where the covering member has a small diameter portion with a diameter-reduced outer peripheral surface in a region from a position facing a discharge port of the nozzle to the tip in the insertion direction.

According to this grease filling device for the ball screw device, the grease is supplied to the gap formed between the outer peripheral surface of the small diameter portion and the inner peripheral surface of the nut and it becomes difficult for the grease to flow to a region other than the small diameter portion where the gap is small. This allows the grease to be selectively pressure-fed toward the nut inner side.

(18) The grease filling device for the ball screw device according to any one of (10) to (17), where the covering member is a sleeve having a side wall portion thinner than a difference between a maximum radius of the screw shaft and a minimum radius of the nut.

According to this grease filling device for the ball screw device, the grease is pressure-fed to the nut inner side through the thin side wall portion.

(19) The grease filling device for the ball screw device according to any one of (10) to (18), where the covering member has a bottomed tubular shape.

According to this grease filling device for the ball screw device, the end portion of the screw shaft can be reliably covered by a bottom of the covering member, and thus adhesion of the grease to the end portion of the screw shaft can be suppressed.

(20) A ball screw device including:
a screw shaft with a first thread groove formed on an outer peripheral surface;
a nut placed around the screw shaft and having a second thread groove formed on an inner peripheral surface;
a plurality of balls arranged in a rolling path between the first thread groove and the second thread groove; and
an infinite circulation path that returns the ball from one part of the rolling path to another part, where
grease is applied to the infinite circulation path of the nut and the grease is not attached to an exposed portion of the screw shaft protruding from the nut.

According to this ball screw device, the grease is applied to the infinite circulation path which requires grease to maintain smooth rotation between the screw shaft and the nut. In addition, since the grease does not adhere to the exposed portion of the screw shaft, adhesion of foreign matter and dirt to the exposed portion is suppressed.

(21) A method for manufacturing a ball screw device which supplies the grease to the infinite circulation path by the grease filling method for the ball screw device according to any one of (1) to (9).

According to this method for manufacturing the ball screw device, it is possible to efficiently manufacture the ball screw device in which the grease is reliably supplied to the infinite circulation path of the nut inner side and adhesion of the grease to the exposed portion of the screw shaft is suppressed.

(22) A method for manufacturing a linear actuator by using the ball screw device manufactured by the method for manufacturing the ball screw device according to (21).

According to this method for manufacturing the linear actuator, it is possible to manufacture a high-quality linear actuator with smooth operation and less dirt on the screw shaft.

(23) A method for manufacturing a vehicle brake by using the ball screw device manufactured by the method for manufacturing the ball screw device according to (21).

According to this method for manufacturing the vehicle brake, it is possible to manufacture a high-quality vehicle brake with smooth operation and less dirt on the screw shaft.

(24) A method for manufacturing a vehicle by using the ball screw device manufactured by the method for manufacturing the ball screw device according to (21).

According to this method for manufacturing the vehicle, it is possible to manufacture a high-quality vehicle with smooth operation and less dirt on the screw shaft.

Advantageous Effects of Invention

According to the invention, the grease supplied to the nut inner side can be accurately and surely supplied to a desired position of the nut inner side while suppressing adhesion to the screw shaft protruding from the nut.

BRIEF DESCRIPTION OF DRAWINGS

FIGS. 10A and 10B are step explanatory views illustrating a state of grease supply, by the grease filling device step by step.

DESCRIPTION OF EMBODIMENTS

Hereinafter, embodiments of the invention will be described in detail with reference to the drawings.

In the following description, a flop-over type ball screw device is exemplified as a ball screw device, but the invention is not limited to this and can be applied to other types.

<Structure of Ball Screw Device>

Figure 1:
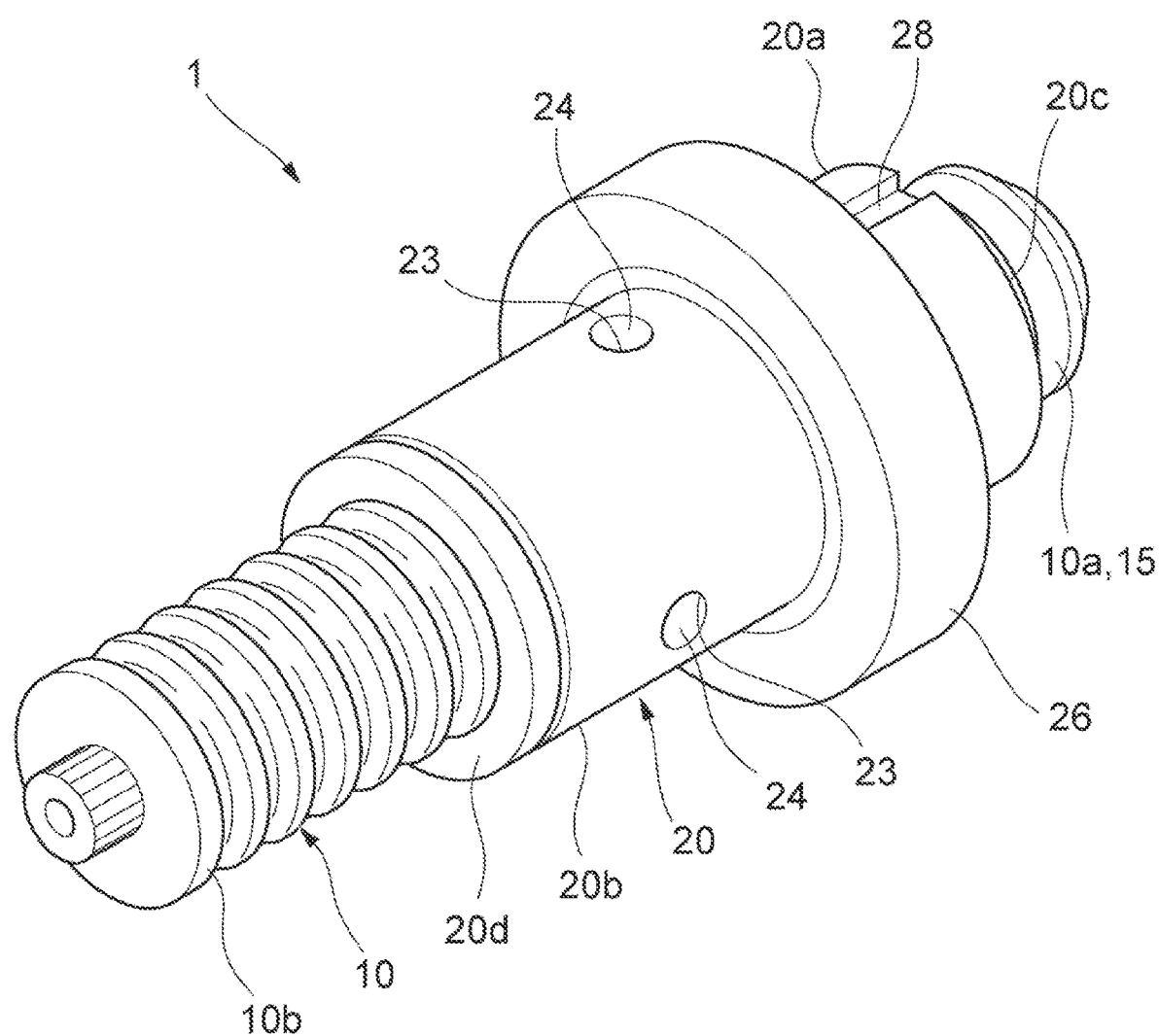
FIG. 1 is an external perspective view of a ball screw device.
Figure 2:
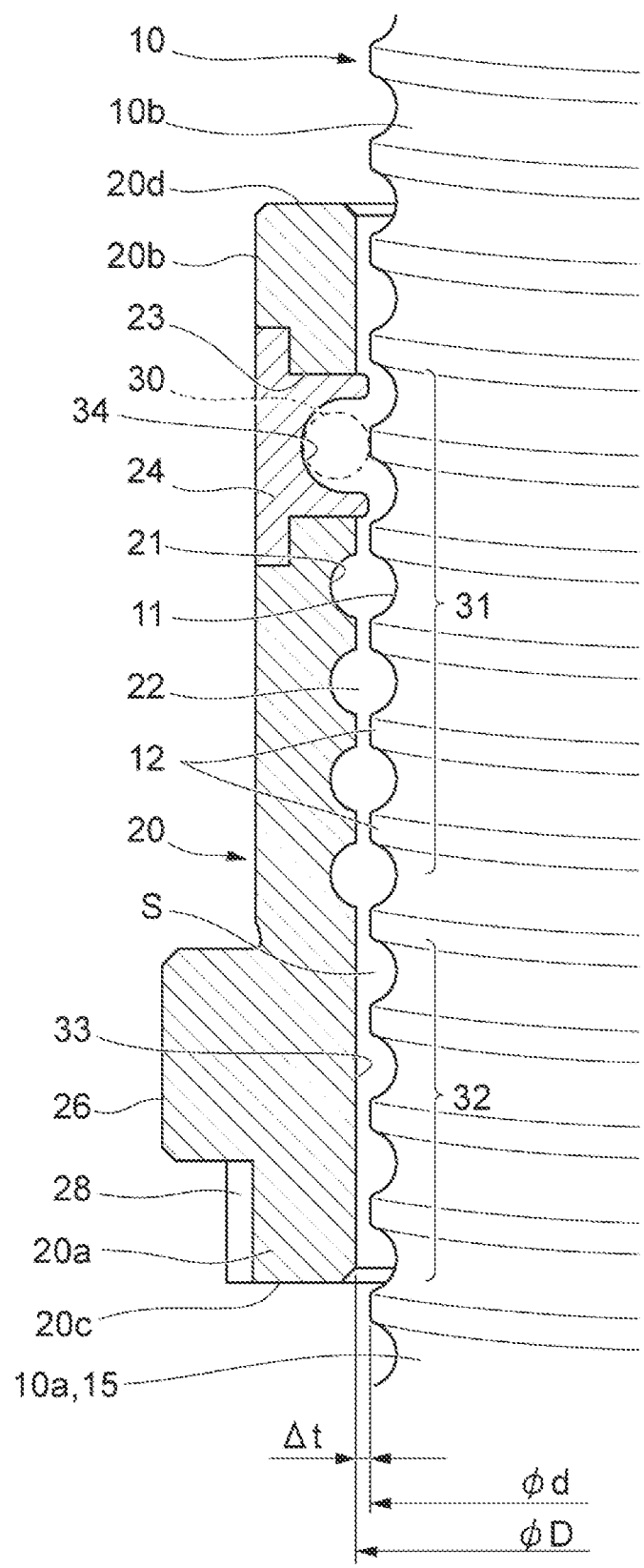
FIG. 2 is a cross-sectional view of a main part of the ball screw device of FIG. 1.

FIG. 1 is an external perspective view of the hall screw device. FIG. 2 is a partial cross-sectional view of the ball screw device illustrated in FIG. 1.

As illustrated in FIGS. 1 and 2, a ball screw device 1 includes a screw shaft 10, a nut 20, and a plurality of balls 30. The nut 20 is placed around the screw shaft 10 having a cylindrical shape. Further, the nut 20 having a substantially cylindrical shape has an inner diameter larger than an outer diameter of the screw shaft 10 and is assembled with a predetermined gap S between the nut 20 and the screw shaft 10.

As illustrated in FIG. 2, a first thread groove 11 having a spiral shape and a predetermined lead is formed on an outer peripheral surface of the screw shaft 10. Further, on an inner peripheral surface of the nut 20, a second thread groove 21 having a spiral shape is formed so as to face the first thread groove 11 and have a lead equal to that of the first thread groove 11. A plurality of balls 30 are rollably arranged in a rolling path 22 having a substantially circular cross section formed by the first thread groove 11 and the second thread groove 21. Further, a screw thread 12 is formed between the adjacent first screw grooves 11.

A plurality of piece holes 23 may be formed in the nut 20 at different phases in a circumferential direction and a piece 24 may be inserted into each piece hole 23. In that case, the piece 24 is formed with a ball circulation portion 34 which circulates the balls 30 which move on the rolling path 22 having a spiral shape.

The ball circulation portion 34 returns the ball 30 from one part of the rolling path 22 to another part. That is, the ball circulation portion 34 scoops up the ball 30 moving on the rolling path 22 toward the piece 24 in a radial direction of the screw shaft 10. Then, the ball circulation portion 34 causes the ball 30 to ride over the screw thread 12 of the screw shaft 10 and returns the ball 30 to the rolling path 22 at least one pitch before. This allows the ball 30 to be circulated.

The piece 24 forms an infinite circulation path 31 including the ball circulation portion 34 and the rolling path 22 on an outer periphery of the screw shaft 10 and which is a trajectory path of the ball 30. When the screw shaft 10 and the nut 20 are relatively rotated, the plurality of balls 30 circulate in the infinite circulation path 31, and thus linear motion in an axial direction of each other becomes smooth.

A region which is on an inner peripheral surface of the nut 20 and is other than the infinite circulation path 31, where the balls 30 are not arranged, is a non-infinite circulation path 32 in which the second thread groove 21 is not formed. An inner peripheral surface 33 of the non-infinite circulation path 32 is a circumferential surface.

The nut 20 is provided with an annular protrusion 26 protruding outward in the radial direction in a part of an outer periphery, but may be configured not to have the protrusion 26. For example, an inner ring trajectory groove is provided on an outer peripheral surface and an outer ring trajectory groove is provided on a member (outer ring member) facing the inner ring trajectory groove, and further a plurality of rolling elements are provided between the inner ring trajectory groove and the outer ring trajectory groove whereby the protrusion 26 becomes a part of a rolling bearing (ball screw support bearing). In that case, a key groove 28 with which a power transmission member (for example, a pulley over which the belt member is bridged) of a torque transmission mechanism (not illustrated) is engaged can be formed at an end portion in the axial direction and the nut 20 can be rotatably supported by a housing such as a vehicle brake via a ball screw support bearing including the protrusion 26.

Here, in order to explain the structure of the ball screw device 1, the reference numerals are defined as follows.

One side (the back side in FIG. 1) of the screw shaft 10 with the nut 20 interposed therebetween is a first end portion 10a and an opposite side (the front side in FIG. 1) of the first end portion 10a is a second end portion 10b. The first end portion 10a of the screw shaft 10 is referred to as an exposed portion 15 as a portion exposed from the nut 20. One end side (the first end portion 10a side of the screw shaft 10) of the nut 20 with the protrusion 26 interposed therebetween is a first nut portion 20a and the other end side (the second end portion 10b side of the screw shaft 10) is a second nut portion 20b. Also, in the nut 20, an end surface on the first nut portion 20a side is referred to as a first nut end surface 20c and an end surface on the second nut portion 20b side is referred to as a second nut end surface 20d. A part of the ball 30 illustrated in FIG. 2 is shown with a virtual line.

<Grease Filling Device for Ball Screw Device>

First Configuration Example

Figure 3:
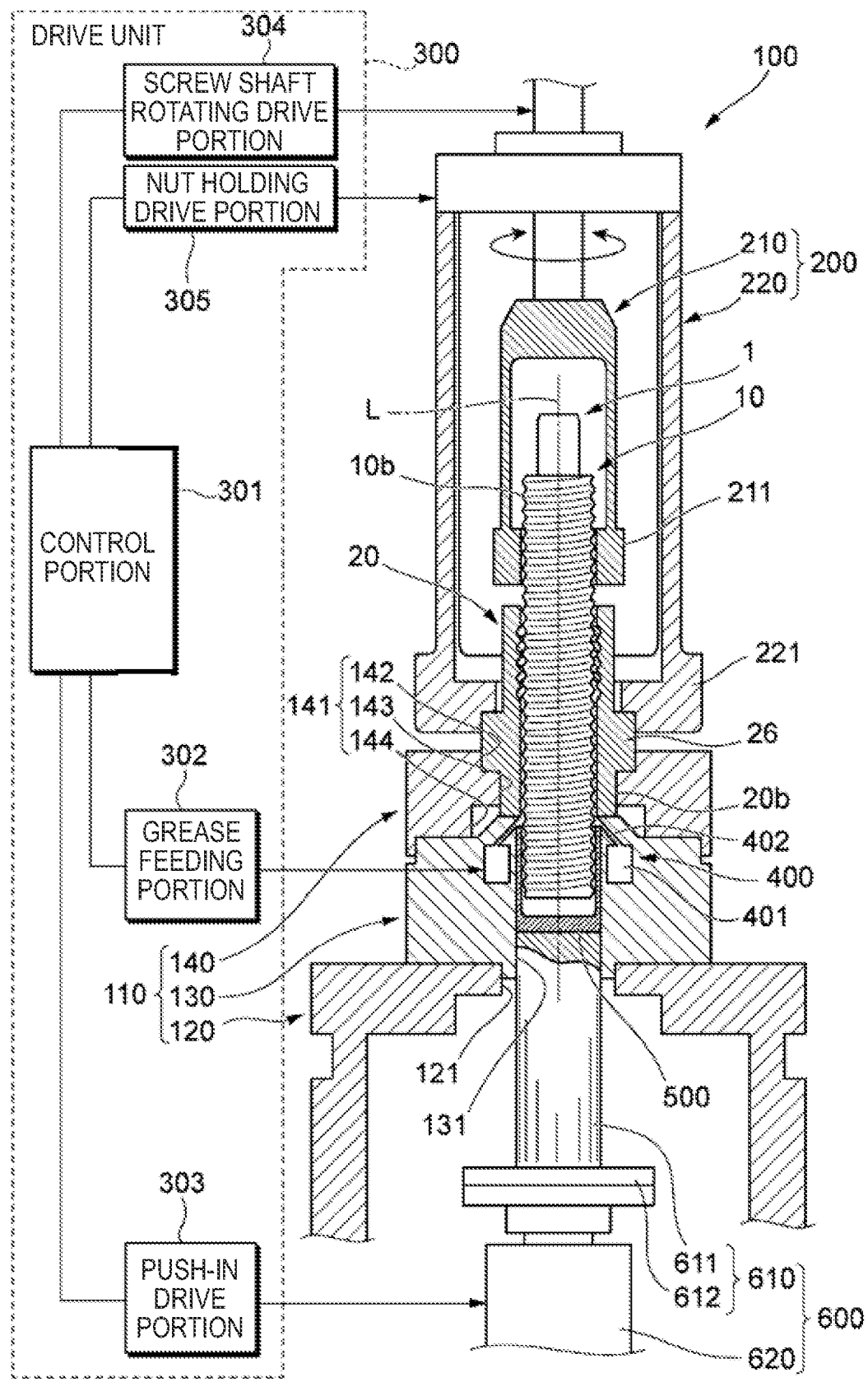
FIG. 3 is an overall configuration diagram of a grease filling device for the ball screw device.

FIG. 3 is an overall configuration diagram of a grease filling device for the ball screw device.

A grease filling device 100 for the ball screw device supplies grease, which is a lubricant, to the nut 20 inner side. Then, in the ball screw device 1 described above, grease G is applied to the infinite circulation path 31 of the nut 20 and the grease G is not attached to the exposed portion 15 of the screw shaft 10 protruding from the nut 20. Hereinafter, the grease filling device 100 for the ball screw device is simply referred to as the grease filling device 100. The grease filling device 100 includes a support unit 110, a rotation mechanism 200, a drive unit 300, a grease supply unit 400, a sleeve 500 which is a covering member, and a sleeve movement mechanism 600. The configurations of the above-mentioned parts will be described below in order.

(Support Unit)

The support unit 110 is a jig which supports one end side of the ball screw device 1 in an axial direction. The support unit 110 includes a base 120 which serves as a fixed pedestal, a support base 130 which is fixed on the base 120, and a nut holding portion 140 which is fixed on the support base 130. An opening portion 121 penetrating the base 120 is formed in a central portion of the base 120. A through hole 131 penetrating the support base 130 is formed in a central portion of the support base 130. A support hole 141 penetrating the nut holding portion 140 is formed in a central portion of the nut holding portion 140. The opening portion 121, the through hole 131, and the support hole 141 are respectively formed coaxially with an axis 1, of the screw shaft 10, so that the base 120, the support base 130, and the nut holding portion 140 are placed coaxially.

An inner diameter of the support hole 141 of the nut holding portion 140 is larger than an inner diameter of the through hole 131. The support hole 141 of this configuration has a first support hole 142, a second support hole 143, and a third support hole 144 in order from the top of FIG. 3 and the inner diameters of these holes are different from each other. The first support hole 142 has an inner diameter slightly larger than an outer diameter of the protrusion 26 for accommodating the protrusion 26 of the ball screw device 1. The second support hole 143 has an inner diameter slightly larger than an outer diameter of the second nut portion 20b so that the second nut portion 20b of the nut 20 can be inserted.

Inside the support base 130, a grease supply unit 400 for supplying the grease G to the gap S between the screw shaft 10 and the nut 20 is provided.

Figure 4:
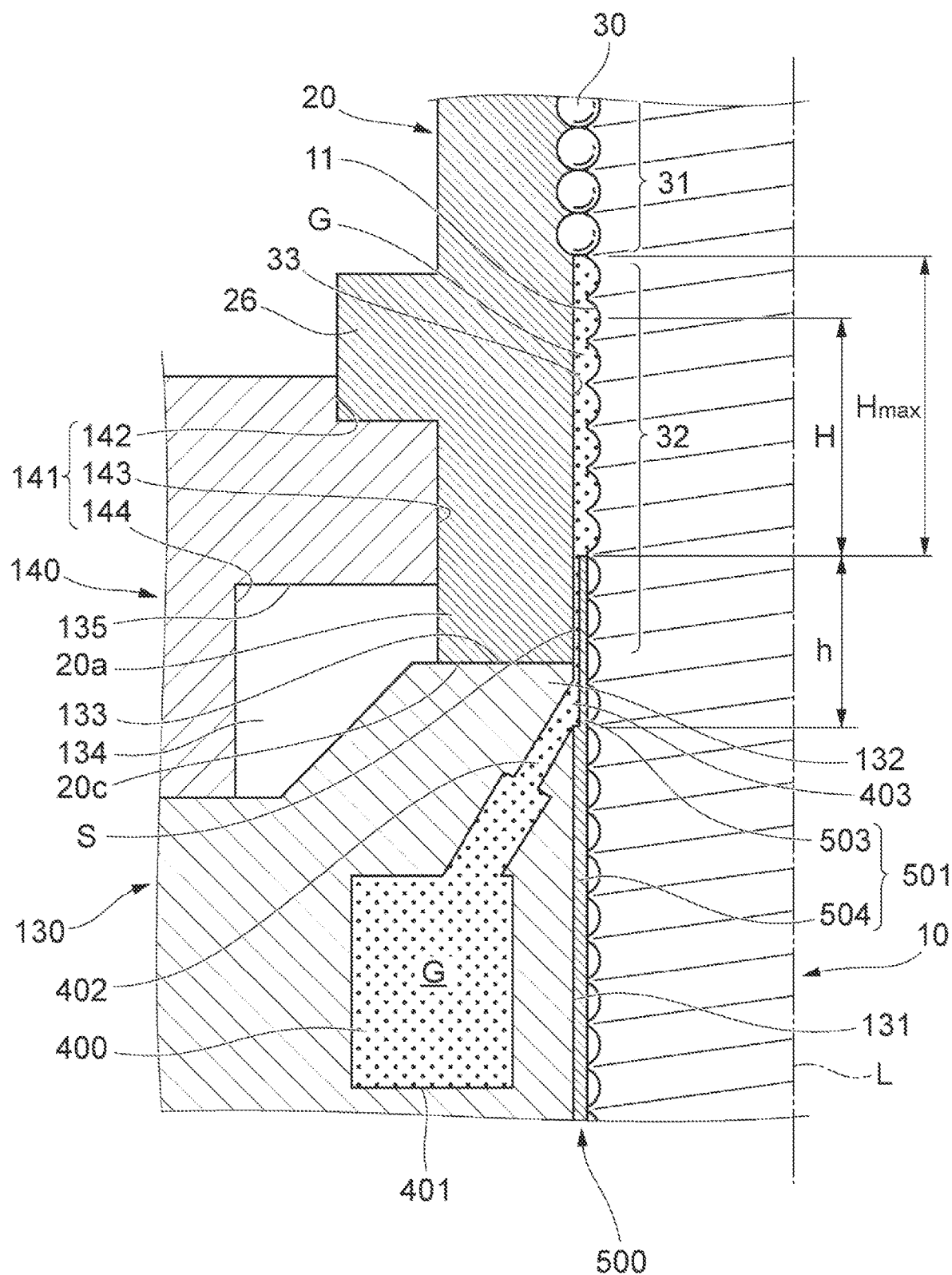
FIG. 4 is a partially enlarged cross-sectional view of a grease supply unit.

FIG. 4 is a partially enlarged cross-sectional view of the grease supply unit 400.

The grease supply unit 400 has a grease reservoir 401 and a plurality of nozzles 402. The grease reservoir 401 has an annular shape centered on the axis L and stores the grease G inside. The plurality of nozzles 402 whose discharge direction is inclined from a radial direction to the nut 20 side are connected to the grease reservoir 401. A tip of each of the plurality of nozzles 402 is tapered and a discharge port 403 opens to an inner peripheral surface of the through hole 131.

The nozzles 402 are arranged at equal intervals along the circumferential direction of the through hole 131, but the arrangement form is not limited to this. For example, the arrangement form may be a single nozzle 402, or the arrangement form may be a slit-shaped, nozzle which is continuous in the circumferential direction. By providing a plurality of nozzles 402 or the nozzle 402 continuously in the circumferential direction, the grease G can be uniformly supplied in the circumferential direction.

The discharge port 403 is disposed in a vicinity of the second nut end surface 20d of the nut 20 in a state where the ball screw device 1 is supported by the support unit 110.

On the support base 130, a surface (the upper surface in FIG. 4) for fixing the nut holding portion 140 rises in an inclined direction of the nozzle 402 and a protruding portion 132 having an annular shape is formed. The first nut end surface 20c of the nut 20 abuts on a top surface 133 of the protruding portion 132 in a state where the ball screw device 1 is supported by the support unit 110.

An air reservoir 134 is defined between the support base 130 and the nut holding portion 140. The air reservoir 134 is an annular space defined by an upper surface of the protruding portion 132, the first nut portion 20a, the third support hole 144 of the nut holding portion 140, and a stepped surface 135. The air reservoir 134 is connected to an air supply unit (not illustrated) and is pressurized to an atmospheric pressure or higher by pressurization from the air supply unit.

In a state where the first nut end surface 20c and the top surface 133 of the protruding portion 132 abut on each other, the air reservoir 134 pushes back the grease G, which is about to leak from between the first nut end surface 20c and the top surface 133 of the protruding portion 132, by internal pressure to prevent grease leakage.

(Rotation Mechanism)

As illustrated in FIG. 3, the rotation mechanism 200 includes a screw shaft fixing portion 210 and a nut pressing portion 220. The screw shaft fixing portion 210 has a clamp portion 211, and the nut pressing portion 220 has a nut fixing mechanism 221.

The rotation mechanism 200 stops the nut 20 of the ball screw device 1 supported by the support unit 110 from rotating and rotates only the screw shaft 10. The screw shaft fixing portion 210 clamps the second end portion 10b of the screw shaft 10 by the clamp portion 211. The term "clamp" as used herein means that the screw shaft 10 is gripped from a direction orthogonal to an axial direction and the screw shaft 10 is rotatably fixed in conjunction with the rotation of the screw shaft fixing portion 210.

The screw shaft 10 is rotationally driven by the screw shaft fixing portion 210 and moves up and down along the axis L with respect to the fixed nut 20. The clamp portion 211 may be rotationally driven integrally with the screw shaft 10 and a configuration of the clamp portion 211 is not particularly limited. For example, the clamp portion 211 can be configured by using a rubber material or the like which has flexibility and can secure a frictional force with the screw shaft 10.

While the screw shaft 10 rotates and moves up and down, the nut 20 is prevented from rotating by the nut pressing portion 220 and is stationary at a position assembled to the support unit 110. In a state where the ball screw device 1 is supported by the support unit 110, the first nut end surface 20c (see FIG. 4) of the nut 20 is pressed against the top surface 133 of the protruding portion 132 of the support base 130 and friction prevents the nut 20 from rotating.

(Drive Unit)

As illustrated in FIG. 3, the drive unit 300 includes a control portion 301, a grease feeding portion 302, a push-in drive portion 303, a screw shaft rotating drive portion 304, and a nut pressing drive portion 305.

The grease feeding portion 302 is, for example, a metering piston which supplies the grease G to the grease supply unit 400 and adjusts the grease supply amount and the grease supply pressure.

The push-in drive portion 303 drives and stops a lifter 620 which raises and lowers a sleeve push-in portion 610, which will be described below. The screw shaft rotating drive portion 304 drives and stops the rotation of the screw shaft fixing portion 210. The nut pressing drive portion 305 drives and stops the raising and lowering of the nut pressing portion 220. The screw shaft rotating drive portion 304 and the nut pressing drive portion 305 are composed of an actuator such as a motor.

The control portion 301 controls the drive and stop instructions of the grease feeding portion 302, the push-in drive portion 303, the screw shaft rotating drive portion 304, and the nut pressing drive portion 305, as well as the drive and stop timings.

(Sleeve)

The sleeve 500 is a covering member placed in the through hole 131 of the support base 130 and inserted into the screw shaft 10 protruding from one end portion of the nut 20 in the ball screw device 1 to cover the exposed portion 15. Here, the sleeve 500 having a cylindrical shape is exemplified as the covering member, but the shape is not limited to this. For example, the covering member may be configured to have a ring portion which abuts on an outer periphery of the screw shaft 10 and a frame member which supports a lower part of the ring portion and any configuration may be used as long as the covering member suppresses the adhesion of grease to the tip portion of the screw shaft 10, which will be described below.

Figure 5:
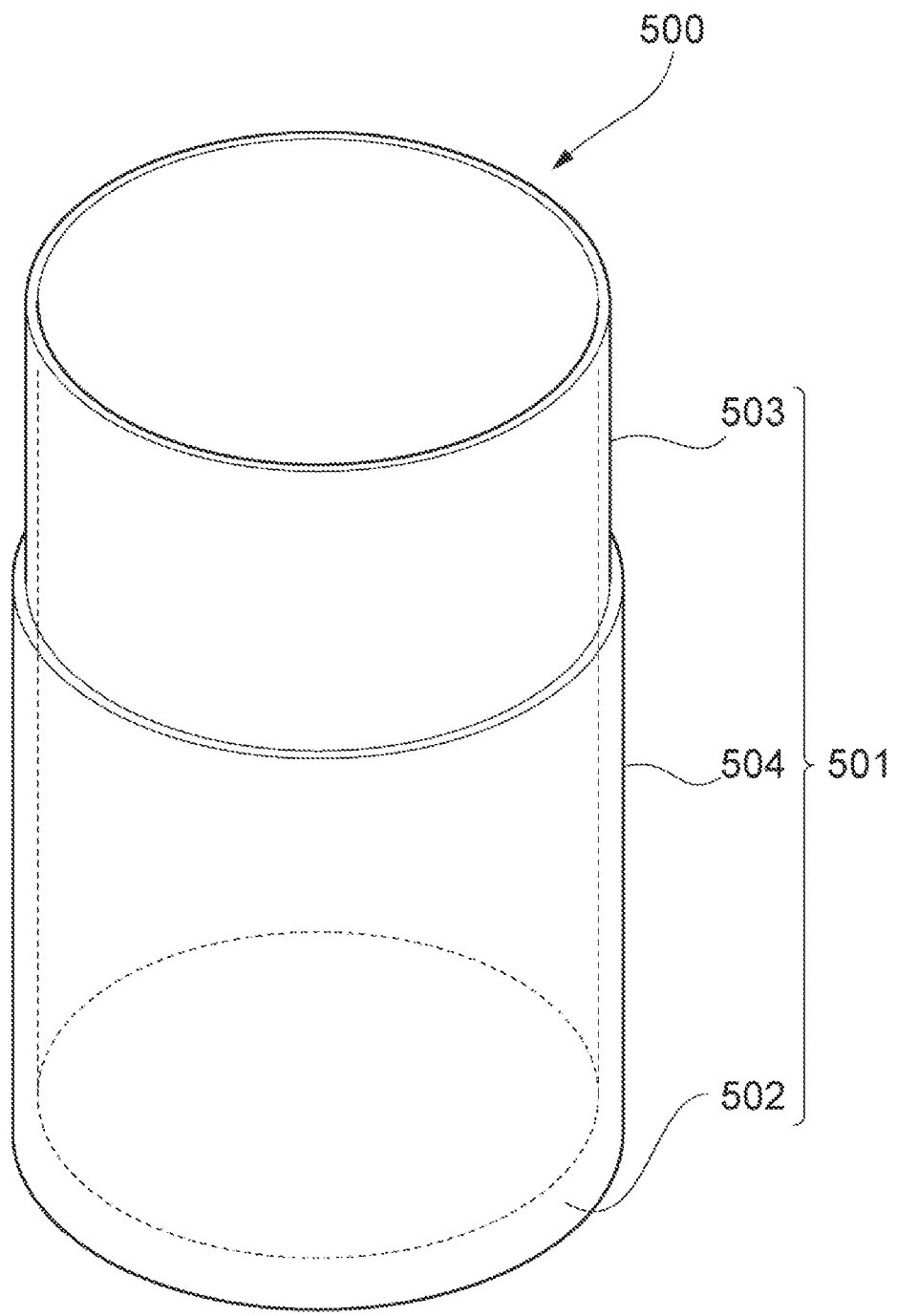
FIG. 5 is an external perspective view of a sleeve.

FIG. 5 is an external perspective view of the sleeve 500.

The sleeve 500 has a bottomed tubular shape having a side wall portion 501 having a cylindrical shape and a bottom portion 502. The side wall portion 501 has a small diameter portion 503 whose outer peripheral surface is reduced in diameter on a tip side and a large diameter portion 504 on a base end side. The small diameter portion 503 is formed by reducing the diameter of an outer peripheral surface and is thinner than a difference Δt between a maximum radius φd of the screw shaft 10 and a minimum radius φD of the nut 20 illustrated in FIG. 2. As illustrated in FIG. 4, the small diameter portion 503 is formed in a region of a tip of the sleeve 500 in an insertion direction from a position facing the discharge port 403 of the nozzle 402 with respect to an axis L direction.

The side wall portion 501 of the sleeve 500 is formed of a metal such as a stainless steel material or a resin material so as to maintain the strength of the thin small diameter portion 503.

(Sleeve Movement Mechanism)

As illustrated in FIG. 3, the sleeve movement mechanism 600 has the sleeve push-in portion 610 and the lifter 620. The sleeve push-in portion 610 has a cylindrical shaft body 611 on a tip side which abuts on the sleeve 500 and a flange portion 612 connected to the lifter 630 is provided on a base end side of the shaft body 611. The shaft body 611 penetrates the opening portion 121 of the base 120 and is inserted into the through hole 131 of the support base 130.

The lifter 620 raises and lowers the flange portion 612 of the sleeve push-in portion 610 along the axis L. The lifter 620 is driven up and down in synchronization with the rotation of the screw shaft fixing portion 210 of the rotation mechanism 200 and the sleeve push-in portion 610 and the sleeve 500 are integrally moved up and down along the axis L direction. That is, the lifter 620 generates a movement in the axis L direction according to a pitch of the screw shaft 10 and the rotation of the screw shaft fixing portion 210, in such a manner that the sleeve 500 and the sleeve push-in portion 610 are driven up and down.

The rotation mechanism 200, the sleeve movement mechanism 600, and the drive unit 300 described above cooperate with each other to function as a grease transfer unit described below which transfers the grease to the infinite circulation path 31.

<Grease Filling Method>

Next, each step of supplying the grease G to the infinite circulation path 31 of the ball screw device 1 by the grease filling device 100 will be sequentially described.

Figure 6:
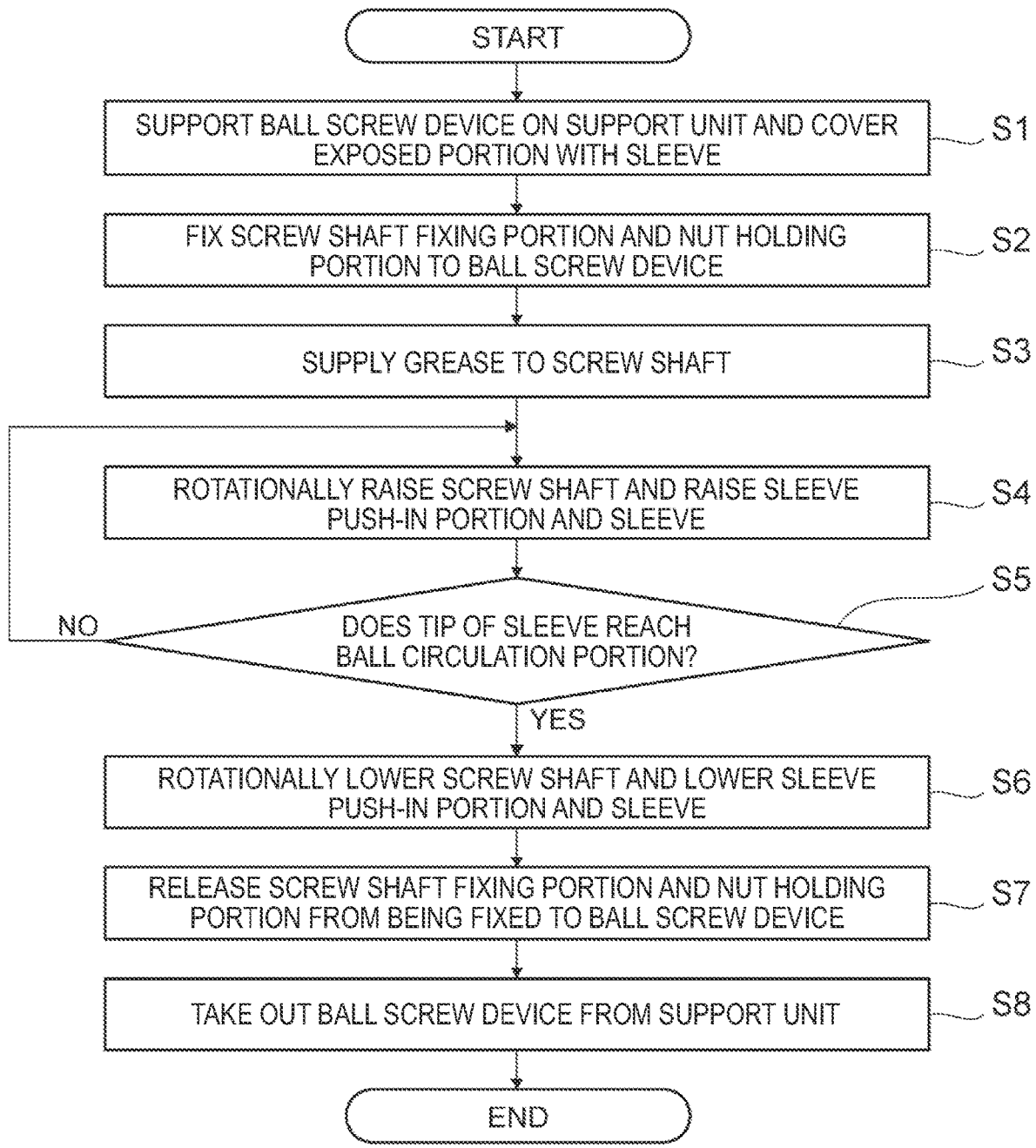
FIG. 6 is a flowchart illustrating a procedure for filling grease in the ball screw device.
Figure 7A:
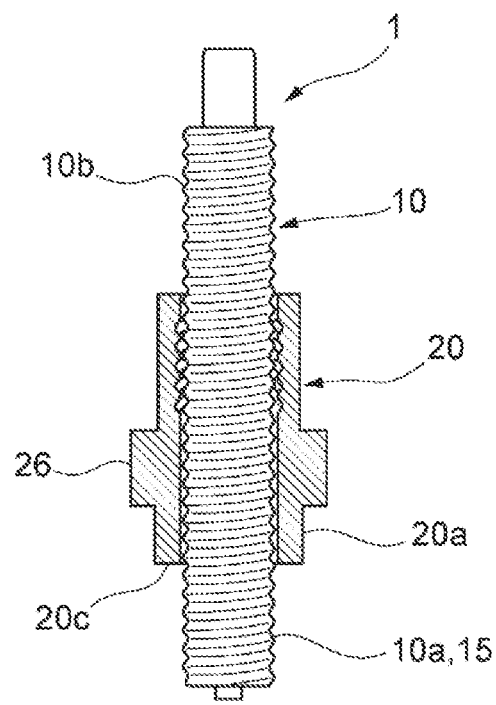
FIG. 7A is a step explanatory view illustrating a grease filling procedure step by step.
Figure 7A:
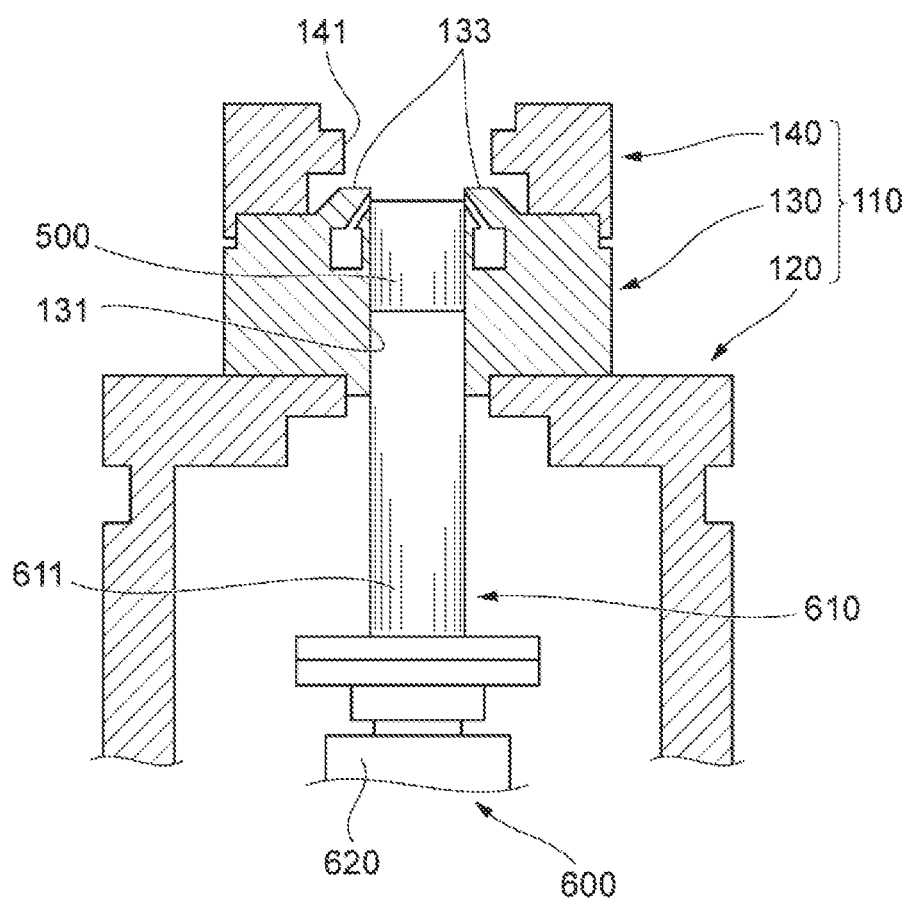

FIG. 6 is a flowchart illustrating a procedure for filling the grease in the ball screw device 1. FIGS. 7A to 7H are step explanatory views illustrating the grease filling procedure step by step. In each procedure, the control portion 301 drives each portion by outputting a drive signal to the screw shaft rotating drive portion 304, the nut pressing drive portion 305, the grease feeding portion 302, and the push-in drive portion 303, (1) Support Step:

As illustrated in FIG. 7A, the ball screw device 1 is placed above the support unit 110. The sleeve 500 is placed in the through hole 131 of the support base 130, Handling of the ball screw device 1 may be performed by an operator or a robot (not illustrated).

Figure 7B:
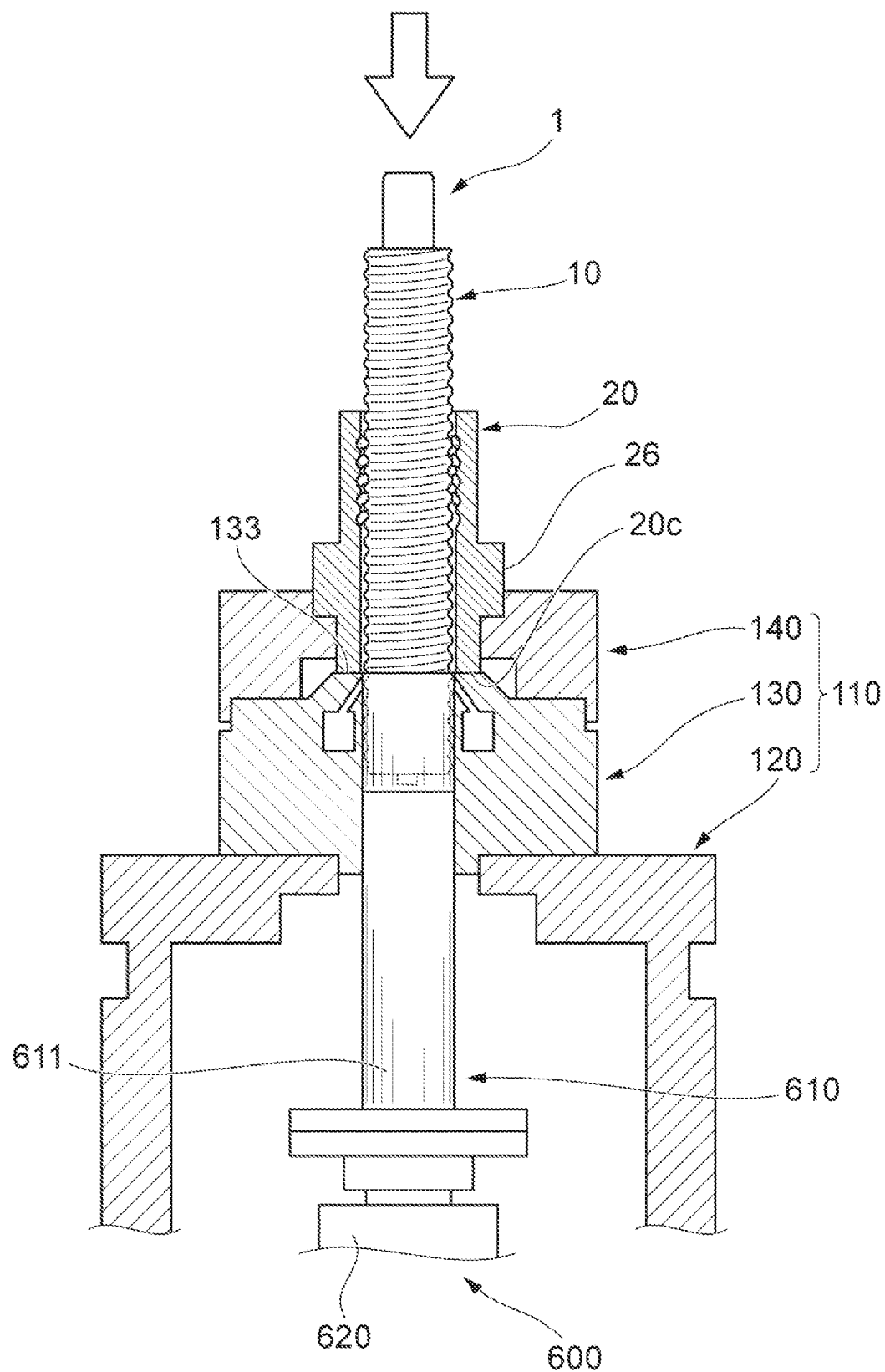
FIG. 7B is a step explanatory view illustrating the grease filling procedure step by step.
Figure 7C:
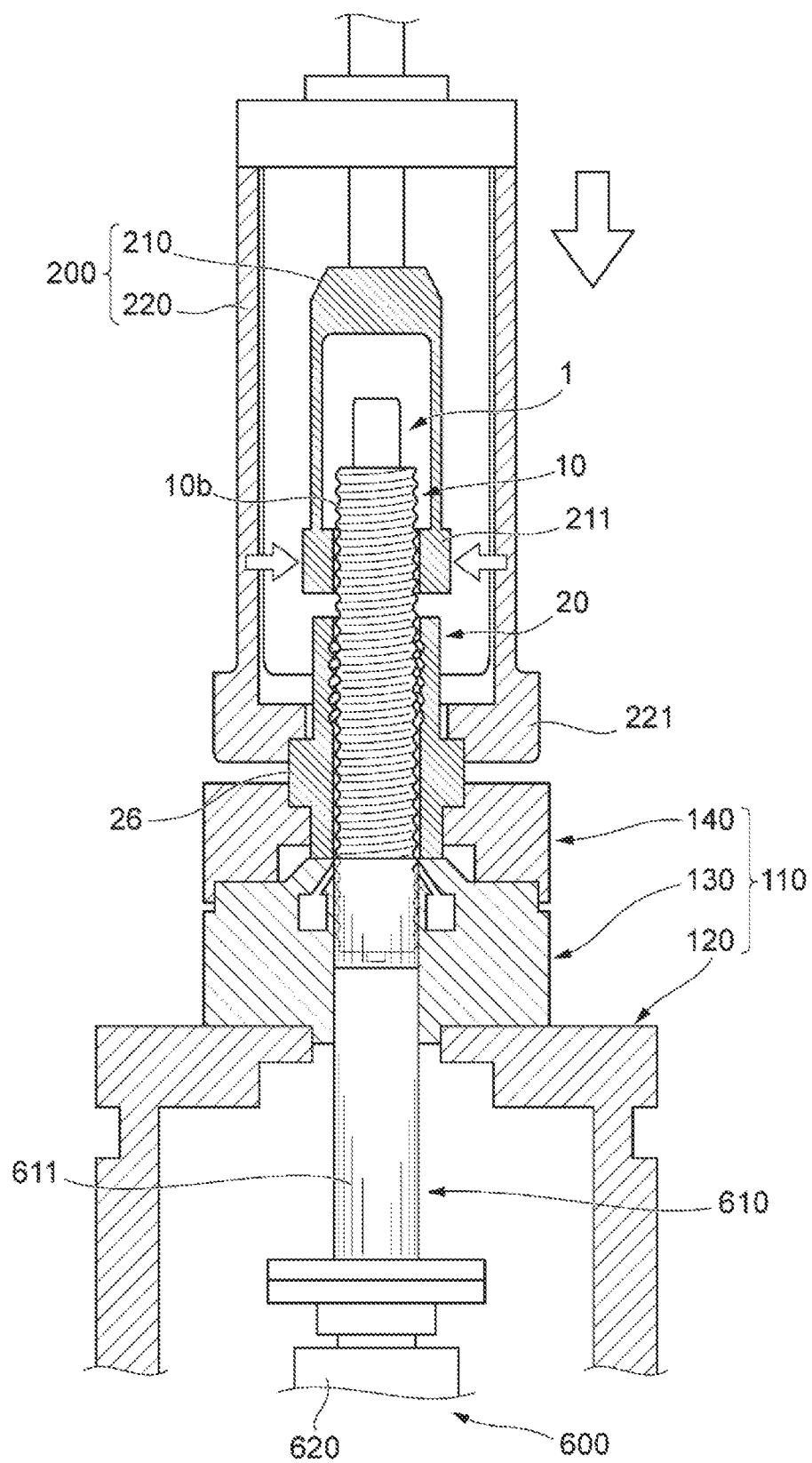
FIG. 7C is a step explanatory view illustrating the grease filling procedure step by step.

First, the ball screw device 1 is lowered toward the support unit 110 and the first nut end surface 20c of the nut 20 is brought into contact with the top surface 133 of the support base 130. Then, as illustrated in FIG. 7B, the first end portion 10a of the screw shaft 10 is inserted into the sleeve 500 through the support hole 141 and the exposed portion 15 of the screw shaft 10 is covered by the sleeve 500 (S1).

(2) Fixing Step:

Next, the screw shaft fixing portion 210 and the nut pressing portion 220 are lowered to fix the ball screw device 1 (S2). That is, the clamp portion 211 of the screw shaft fixing portion 210 grips the second end portion 10b of the screw shaft 10 and the nut fixing mechanism 221 of the nut pressing portion 220 presses the protrusion 26 of the nut 20 toward the support unit 110 side. As a result, the nut 20 of the ball screw device 1 is fixed to the support unit 110 and the screw shaft 10 is supported by the rotatable screw shaft fixing portion 210.

Figure 7D:
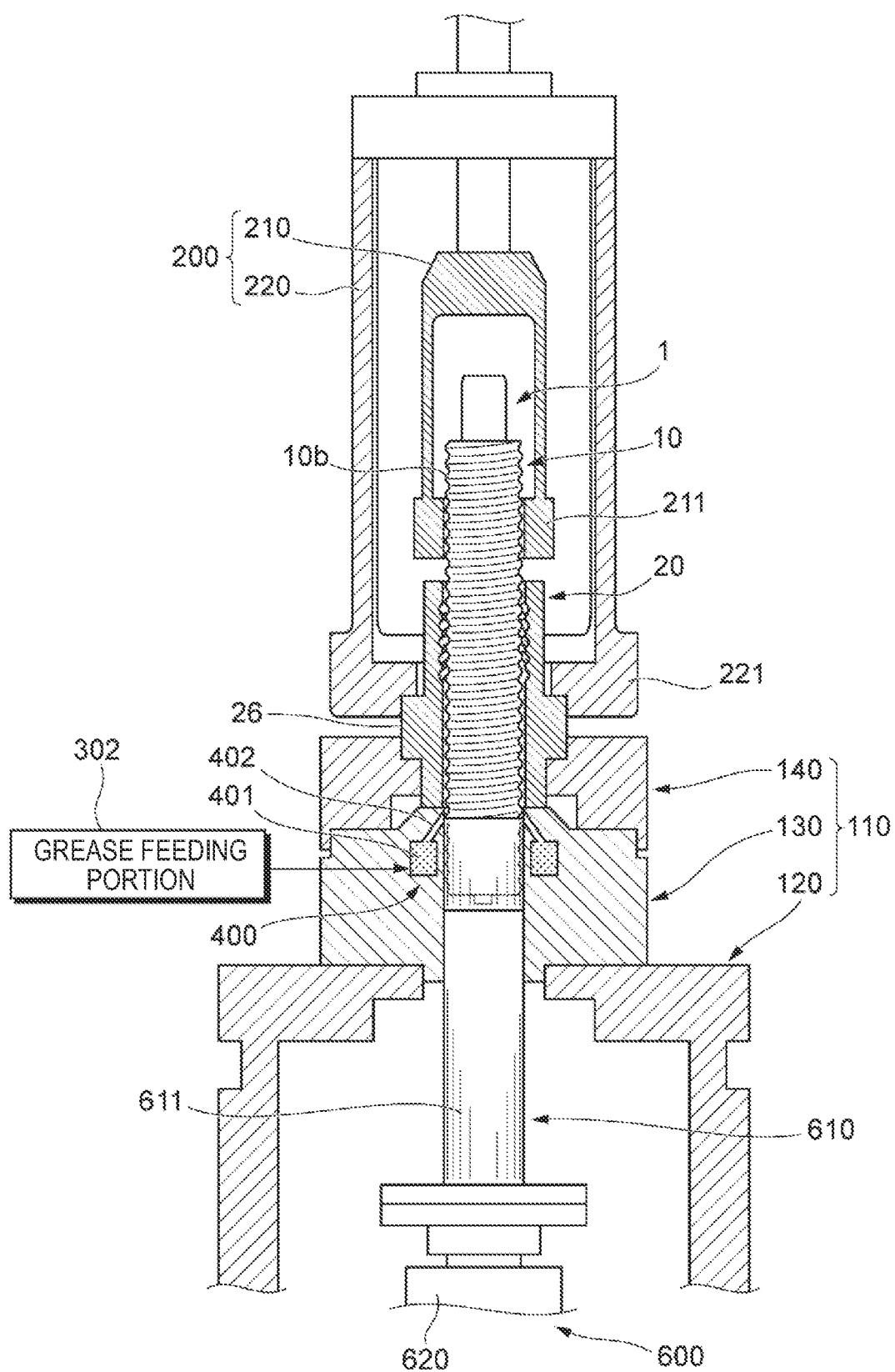
FIG. 7D is a step explanatory view illustrating the grease filling procedure step by step.

(3) Grease Pressure-Feeding Step:

Next, as illustrated in FIG. 7D, the grease feeding portion 302 is driven to supply the grease G to the grease reservoir 401 of the grease supply unit 400. Then, the grease feeding portion 302 supplies a predetermined amount of grease G from the nozzle 402 toward the nut inner side while adjusting the feeding amount, feeding speed, feeding pressure, and the like of the grease G (S3).

By this operation, as illustrated in FIG. 4, the grease G is supplied to the gap S between the screw shaft 10 and the nut 20 from the first nut portion 20a side, Since the sleeve 500 is placed facing the discharge port 403 of the nozzle 402 at the time of discharging the grease G, the grease G discharged from the nozzle 402 collects in the non-infinite circulation path 32 without adhering to the exposed portion 15 of the screw shaft 10 covered with the sleeve 500.

Figure 8A:
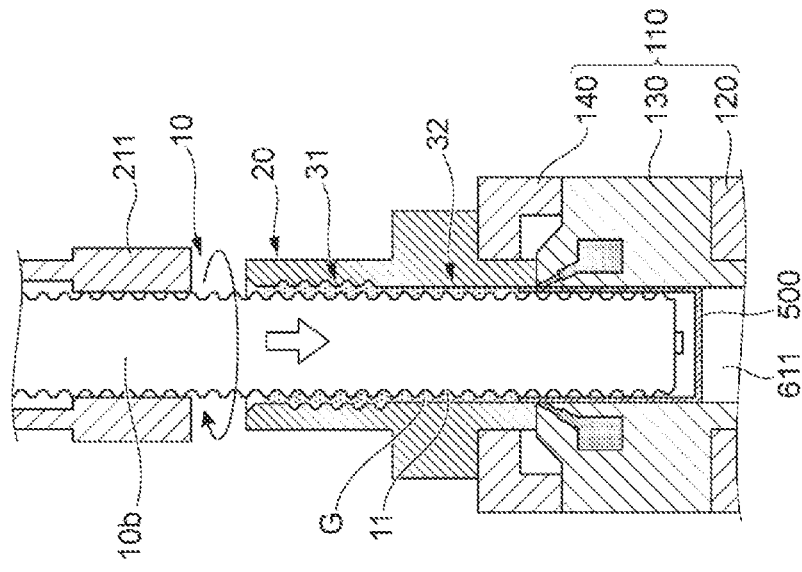
FIGS. 8A to 8C are step explanatory views illustrating a mode of supplying grease to a nut.
Figure 8B:
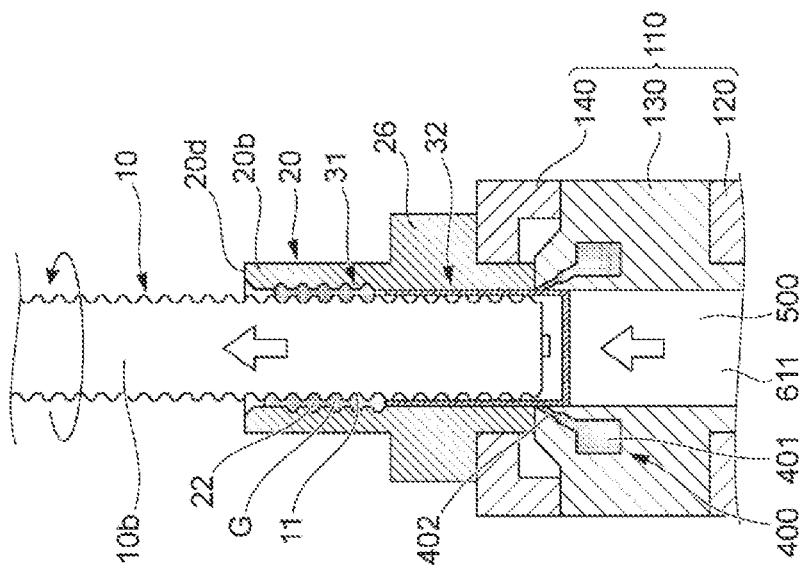
Figure 8C:
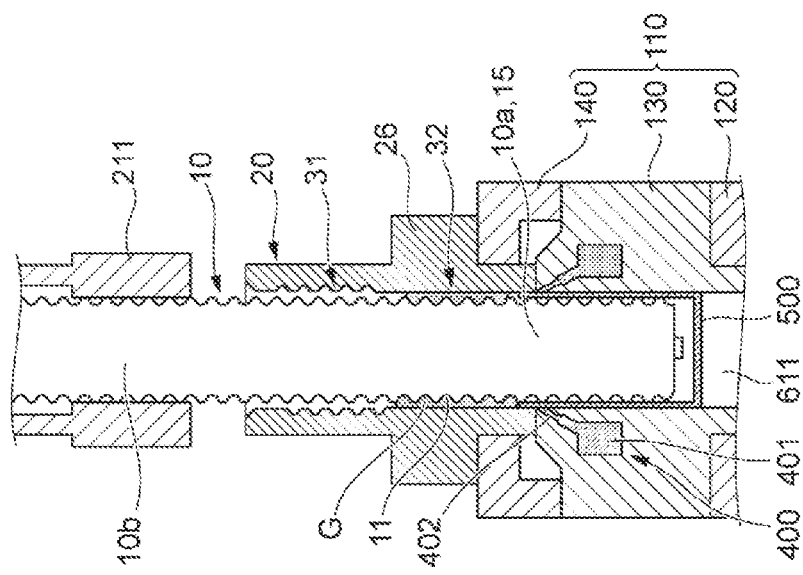

FIGS. 8A to 8C are step explanatory views illustrating a mode of supplying the grease G to the nut 20. In FIGS. 8A to 8C, the balls arranged at the infinite circulation path 31 are not illustrated.

To explain the grease pressure-feeding step in more detail, as illustrated in FIG. 8A, while the screw shaft 10 is stationary, the grease G is pressure-fed to the first thread groove 11 of the screw shaft 10 in the non-infinite circulation path 32.

In the grease pressure-feeding step, the grease G is supplied to the non-infinite circulation path 32 from the nozzle 402 connected to the grease reservoir 401 as illustrated in FIG. 4. That is, the grease G discharged from the nozzle 402 is filled in the gap S between the small diameter portion 503 (the region of a height h in the axis L direction) of the sleeve 500 and the inner peripheral surface of the through hole 131 of the support base 130, and then the grease G is pressure-fed from the gap S to the non-infinite circulation path 32 above the gap S. In the non-infinite circulation path 32, the grease G is filled between the first thread groove 11 of the screw shaft 10 and the inner peripheral surface 33 of the nut 20. A filling region of the grease G on the screw shaft 10 may be a range of the height h of the small diameter portion 503 described above and a range of a height Hmax from the upper end of the sleeve 500 to the infinite circulation path 31 of the nut 20, or may be a range up to a height H lower than the height Hmax. The filling region is appropriately set according to a diameter of the infinite circulation path 31, a length in the axis L direction, and the like.

Also, in the grease pressure-feeding step, the grease G, which may leak from between the first nut end surface 20c and the top surface 133 of the protruding portion 132 illustrated in FIG. 4, is prevented from leaking by the internal pressure of the air reservoir 134.

(4) Grease Transfer Step

Figure 7E:
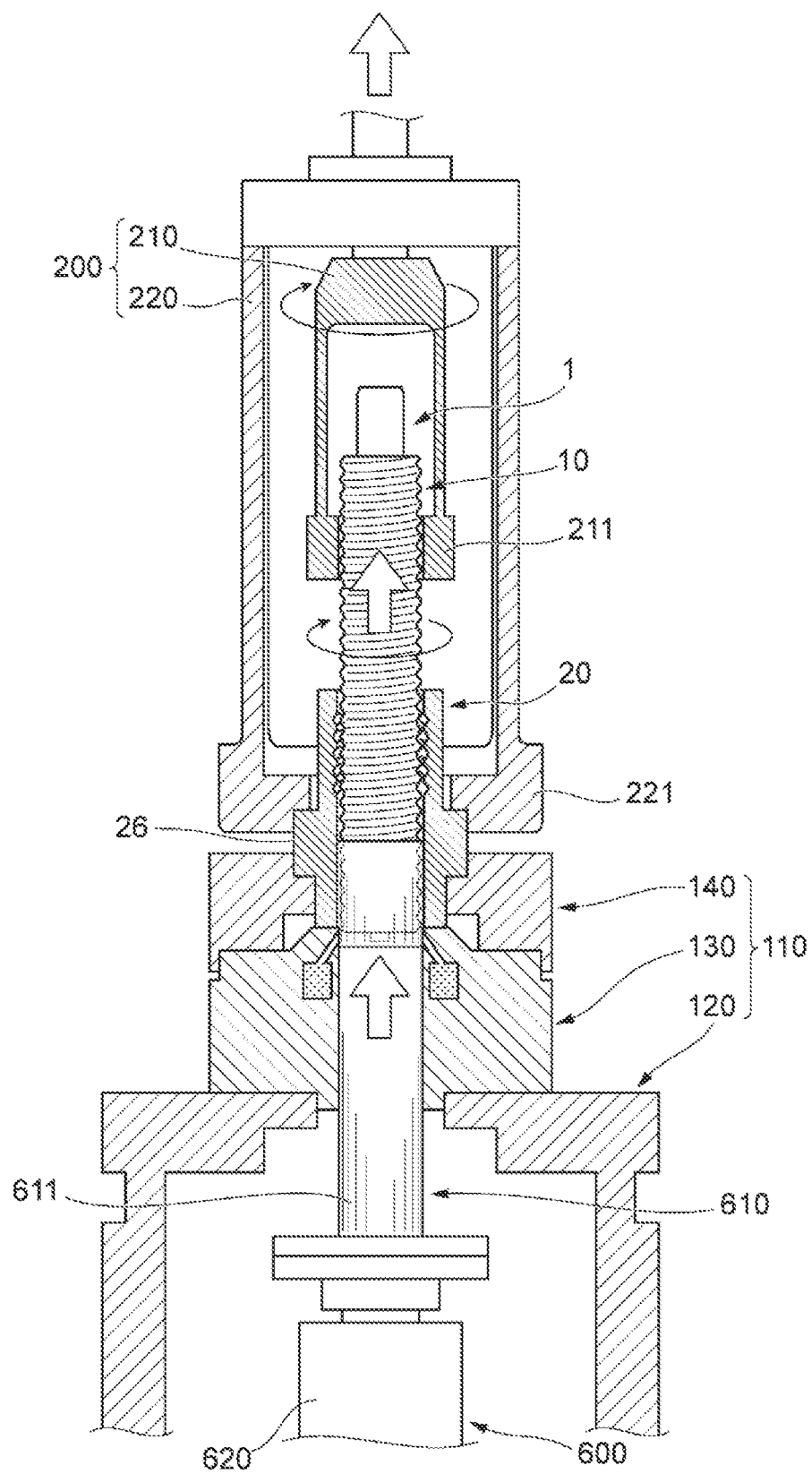
FIG. 7E is a step explanatory view illustrating the grease filling procedure step by step.

Next, as illustrated in FIG. 7E, the screw shaft fixing portion 210 is rotationally driven to raise the screw shaft 10 while rotating the screw shaft 10. Further, the lifter 620 is driven in synchronization with the rotation of the screw shaft fixing portion 210 to raise the shaft body 611 of the sleeve push-in portion 610. In this case, the movement speed and the movement amount of the screw shaft 10 and the shaft body 611 are to be equal to each other. When the shaft body 611 of the sleeve push-in portion 610 rises, the sleeve 500 is inserted into the first nut portion 20a of the nut 20. Then, the grease G supplied to the non-infinite circulation path 32 of the nut 20 is scraped of by the tip of the sleeve 500 and transferred toward the infinite circulation path 31 (S4).

Then, as illustrated in FIG. 8B, while covering the exposed portion 15 of the screw shaft 10 with the sleeve 500, the screw shaft 10 is rotationally driven until the tip of the sleeve 500 in the insertion direction reaches the end portion of the infinite circulation path 31. The sleeve 500 rotates with the rotation of the screw shaft 10 and rises integrally with the screw shaft 10. As a result, the grease G filled in the first thread groove 11 of the screw shaft 10 is agitated by a ball (not illustrated) which rolls on the rolling path 22 of the infinite circulation path 31 and spreads to the infinite circulation path 31. The tip of the sleeve 500 in the insertion direction does not necessarily have to reach the end portion of the infinite circulation path 31 and may be moved closer to the end portion in some cases.

Here, the rotation of the screw shaft 10 prevents the grease G from leaking from the upper end of the infinite circulation path 31, that is, the second nut end surface 20d of the second nut portion 20h of the nut 20. By this operation, the grease G is supplied to the infinite circulation path 31.

In the grease transfer step described above, the control portion 301 determines whether the tip of the sleeve 500 in the insertion direction reaches the infinite circulation path 31 (S5), As a determination method, in addition to determining by detecting a rotation angle (the timber of rotations) of the screw shaft 10, a contact type or non-contact type position sensor may be provided and the determination may be performed by detecting a position of the screw shaft 10 through the position sensor. Further, it may be determined not necessarily whether the tip reaches the infinite circulation path 31, but whether the movement amount reaches a predetermined movement amount.

(5) Return Step

Figure 7F:
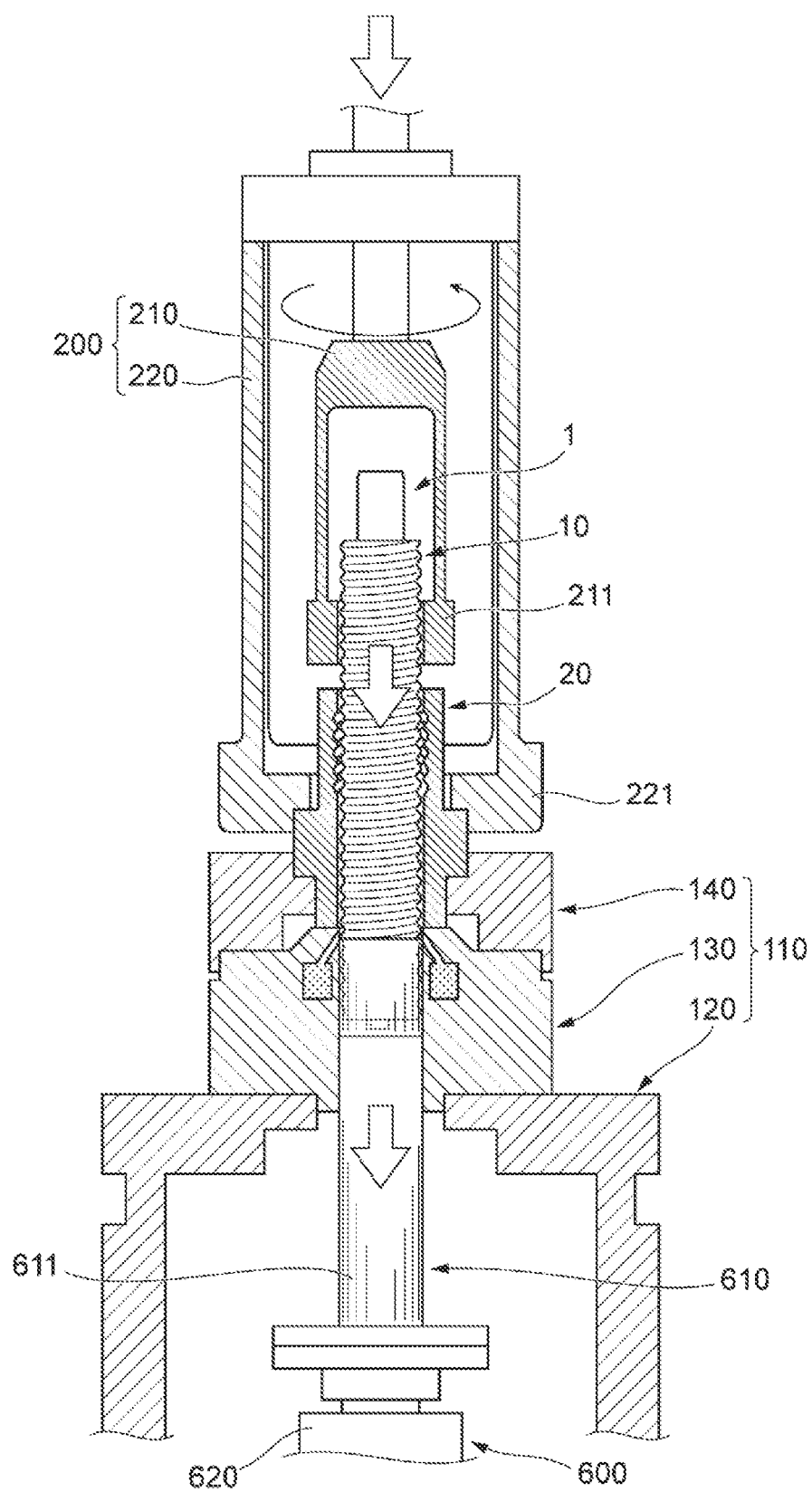
FIG. 7F is a step explanatory view illustrating the grease filling procedure step by step.

Next, as illustrated in FIG. 7F, the screw shaft fixing portion 210 is rotated in a direction opposite to the direction during the grease transfer step to lower the screw shaft 10 and the lifter 620 is driven to lower the sleeve 500 together with the shaft body 611 of the sleeve push-in portion 610 (S6). When the screw shaft 10 and the sleeve 500 return to original positions illustrated in FIG. 8A, the rotation of the screw shaft fixing portion 210 is stopped.

(6) Taking Out Step

Figure 7G:
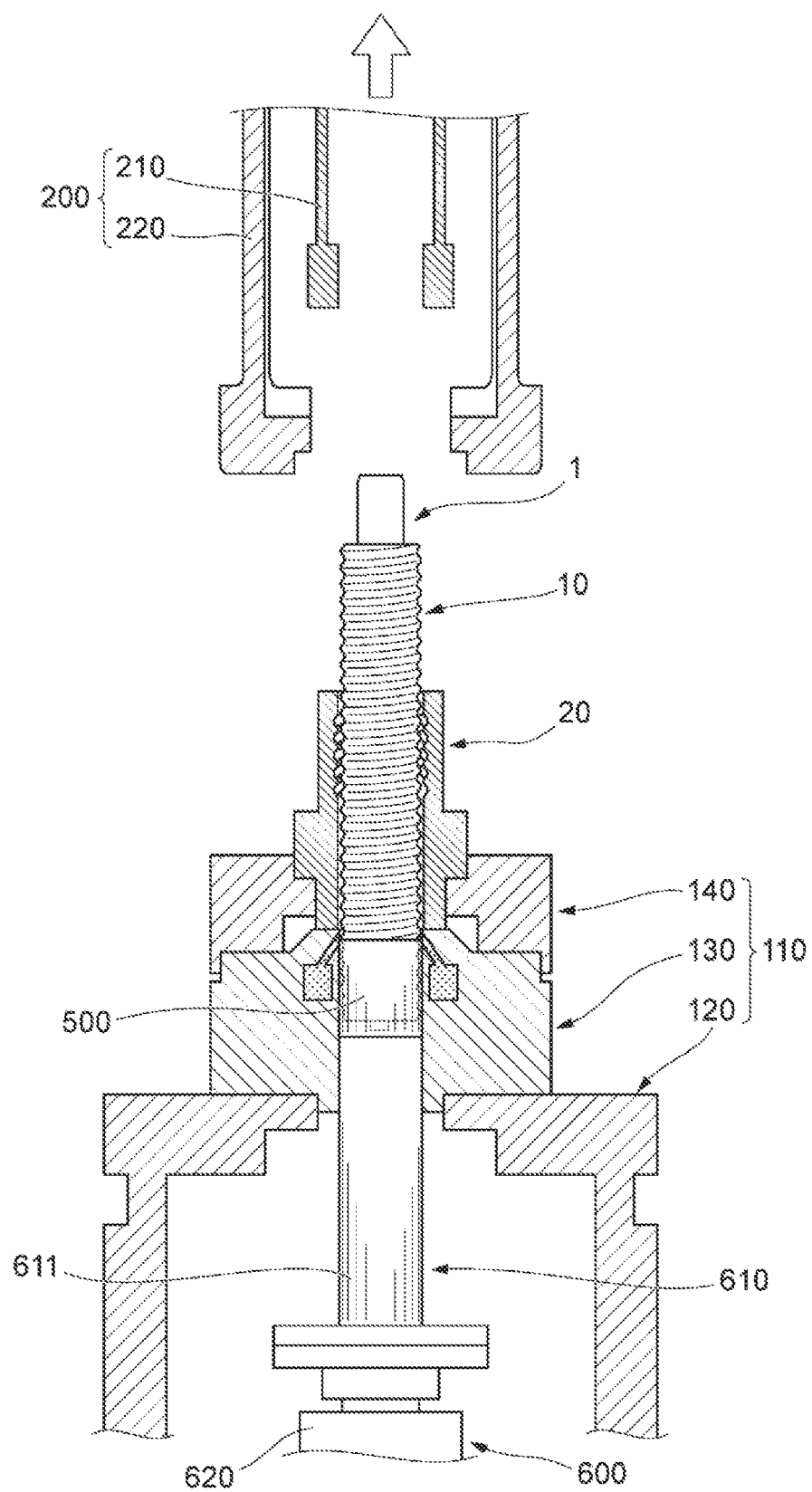
FIG. 7G is a step explanatory view illustrating the grease filling procedure step by step.

Then, as illustrated in FIG. 7G, the screw shaft fixing portion 210 and the nut pressing portion 220 are released from being fixed to the ball screw device 1 and the screw shaft fixing portion 210 and the nut pressing portion 220 are retracted upward (S7).

Figure 7H:
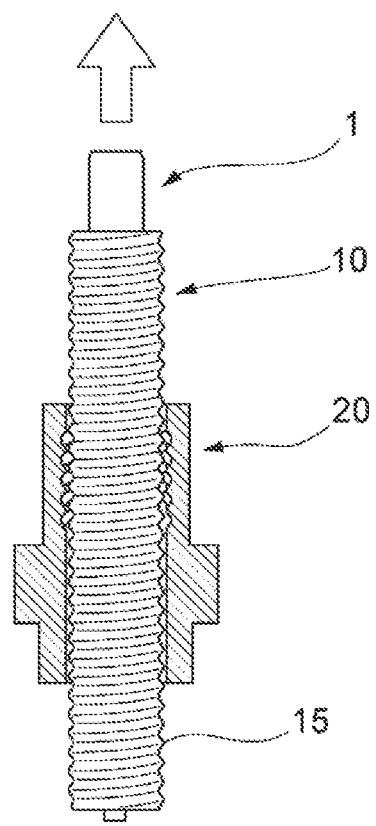
FIG. 7H is a step explanatory view illustrating the grease filling procedure step by step.
Figure 7H:
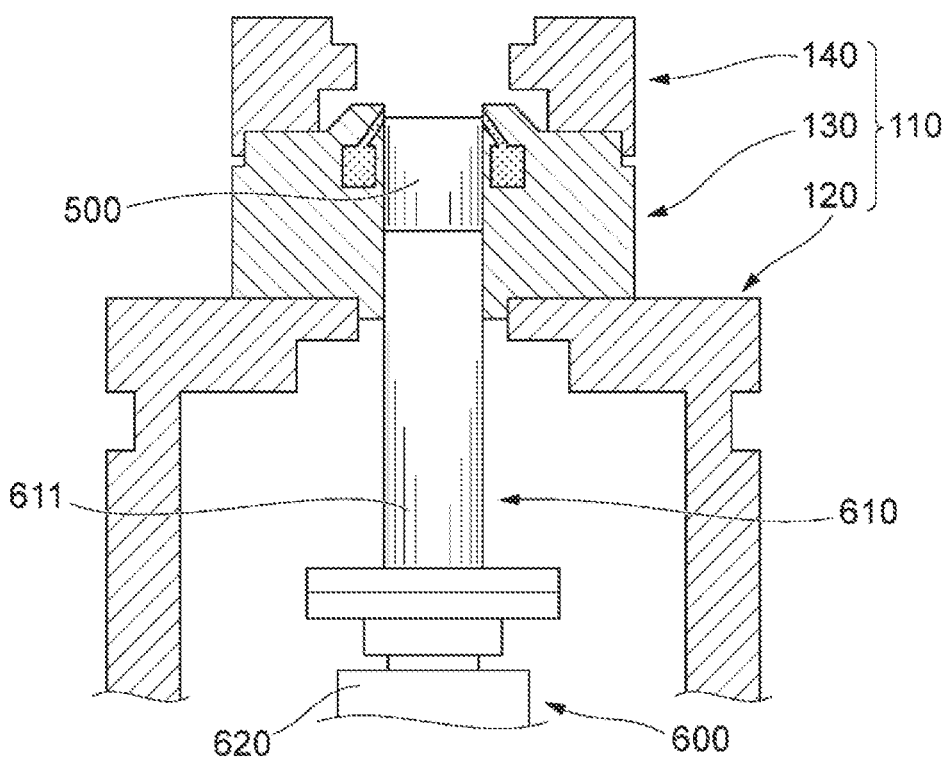

Further, as illustrated in FIG. 7H, the ball screw device 1 supported by the support unit 110 is pulled out upward and the ball screw device 1 is taken out from the support unit 110 (S8). In this case, since the sleeve 500 is integrally connected to the shaft body 611 of the sleeve push-in portion 610, the exposed portion 15 of the screw shaft 10 covered with the sleeve 500 is exposed by removing the sleeve 500. As a result, the exposed portion 15 of the screw shaft 10 is in a state where the grease G is not applied and foreign matter and dirt are less likely to adhere to the exposed portion 15.

With the grease transfer unit composed of the above-described rotation mechanism 200, drive unit 300, and sleeve movement mechanism 600, the grease G can be reliably supplied to the infinite circulation path 31 of the nut 20, in addition, it is possible to supply grease to a desired position with the minimum required grease supply amount. Further, since the exposed portion 15 of the screw shaft 10 is always covered by the sleeve 500 during the supply of grease, the adhesion of grease G can be prevented.

Since the grease feeding portion 302 can freely adjust the grease supply amount, supply speed, supply pressure, and the like to the grease supply unit 400, an appropriate amount of grease G can be reliably supplied to the infinite circulation path 31. In addition, it is possible to reliably prevent the grease G from being extruded from the second nut portion 20b side of the nut 20. As a result, it is possible to prevent the grease G from adhering to the screw shaft 10 protruding from both ends of the nut 20.

Furthermore, by controlling the supply amount and supply pressure of the grease by the grease feeding portion 302, grease filling with a high degree of freedom in step setting can be performed on various types of ball screw devices with different specifications such as the width and diameter of the infinite circulation path 31 and the axial length of the nut 20. For example, not only the grease supply to the infinite circulation path 31 but also the selective grease supply to any part becomes possible, and thus it is possible to realize a more versatile and accurate grease supply with a high degree of freedom. Further, since a grease supply amount can be changed only by adjusting the grease feeding portion 302, the adjustment work is not complicated and the step can be easily changed. In this way, grease supply to ball screw devices of various specifications can be easily automated, and thus production efficiency can be improved.

Second Configuration Example

Next, a second configuration example of the grease filling device 100 will be described.

Figure 9:
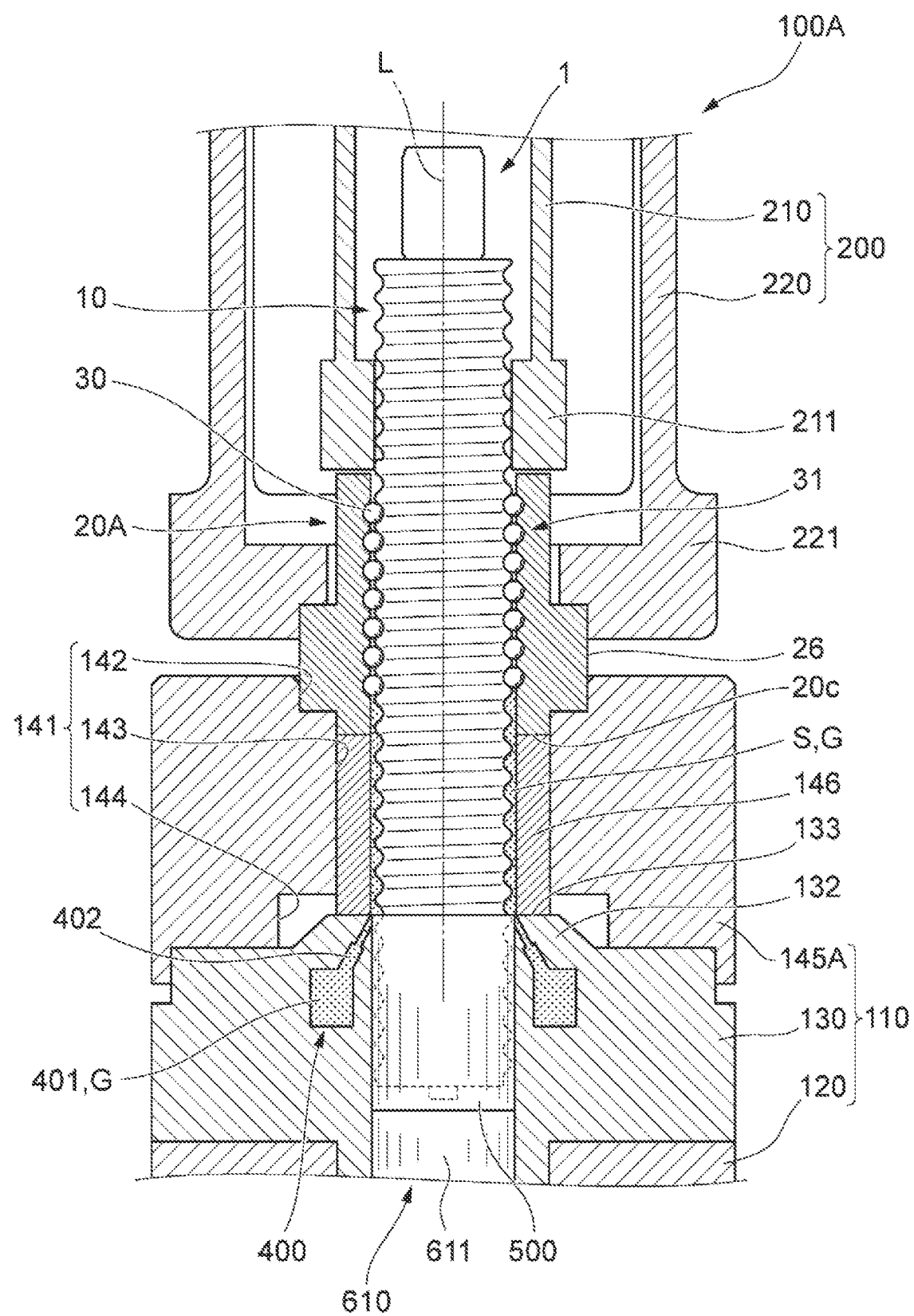
FIG. 9 is a partially enlarged cross-sectional view illustrating a main part of a grease filling device of a second configuration example.

FIG. 9 is a partially enlarged cross-sectional view illustrating a main part of a grease filling device 100A of the second configuration example.

The above-mentioned nut 20 has the non-infinite circulation path 32 and the inner peripheral surface 33 (see FIG. 2) in which the second thread groove 21 is not formed. However, a nut 20A used here has the infinite circulation path 31 in which the second thread groove 21 is formed in substantially the entire area along the axis L and does not have a non-infinite circulation path.

In a nut holding portion 145A of the grease filling device 100A, a collar 146 having a cylindrical shape is accommodated in the support hole 141. One end of the collar 146 in an axial direction abuts on a first nut end surface 20c of the nut 20A and the other end of the collar 146 in the axial direction abuts on the top surface 133 of the protruding portion 132. An outer peripheral surface of the collar 146 fits into an inner peripheral surface of the second support hole 143 and a slight gap is formed between the inner peripheral surface of the collar 146 and the screw shaft 10. Other configurations are the same as those of the first configuration example described above.

FIGS. 10A and 10B are step explanatory views illustrating a state of grease supply by the grease filling device 100A step by step.

In the grease filling device 100A of this configuration, during the grease feeding step, the grease G supplied from the grease supply unit 400 is supplied to a gap S between the screw shaft 10 and the collar 146 from the tip of the sleeve 500 in the insertion direction.

As illustrated in FIG. 10A, the grease G supplied to the gap S is supplied to the infinite circulation path 31 by raising the sleeve 500 as the screw shaft 10 is raised in the grease transfer step. Also, in this case, an amount of rise of the screw shaft 10 is limited to a range in which the grease G does not leak from the second nut end surface 20d of the nut 20A.

Then, as illustrated in FIG. 10B, the screw shaft 10 is rotated in a reverse direction to lower the screw shaft 10 to an original position and the shaft body 611 of the sleeve push-in portion 610 is lowered to lower the sleeve 500 as well.

As a result, it is possible to prevent the grease G from leaking from the second nut end surface 20d of the nut 20A and it is possible to prevent the grease G from adhering to a portion covered by the collar 146 of the screw shaft 10.

The ball screw device 1 described above is generally mounted on a machine or a vehicle, and is applied to an application in which a specific mechanical part or portion is moved by rotational drive.

In addition, the ball screw device 1 is also applied to a machine having a rotating portion or a sliding portion, various manufacturing devices, an actuator (linear actuator), drive devices with multiple degrees of freedom such as XY tables combined with actuators, a support unit for a rotation mechanism in a linear motion device, and a support unit of a linear motion mechanism portion in a rotating device. Further, the ball screw device 1 is also applied to a rotation support unit of a steering device such as a steering column, an electric power steering device, and a worm reducer. Further, the ball screw device 1 can be applied to a vehicle such as an automobile, a motorcycle, and a train, or a brake device for a vehicle.

A method for manufacturing a ball screw device to which the above-described grease filling method is applied can be applied to a method for manufacturing a linear actuator, a vehicle brake, a vehicle, or the like.

As described above, the invention is not limited to the embodiments described above. It is also intended for the invention to be modified and applied by those skilled in the art based on the combination of the configurations of the embodiments with each other, the description of the specification, and the well-known technique and those are included in the scope of seeking protection.

For example, the nuts 20 and 20A are provided with the protrusion 26, but the shape of the nuts 20 and 20A is freely selected and the protrusion 26 may be omitted. Further, the nuts 20 and 20A may have a circulation portion processed in the thread groove instead of having the piece 24.

Further, in the configuration example described above, the grease G is supplied to the infinite circulation path 31 by fixing the nut 20 (20A) and rotating the screw shaft 10. However, the screw shaft 10 may be fixed to a member such as the support unit 110 so as to be movable in the axial direction and non-rotatable and the nut 20 (20A) may be rotated. In this case, since a diameter of the nut 20 (20A) is larger than a diameter of the ball screw 10, the nut 20 (20A) can be rotationally driven with a low torque. That is, one of the screw shaft and the nut 20 (20A) may be moved in the axial direction by relatively rotating the screw shaft 10 and the nut 20 (20A).

Further, the grease filling device 100 (100A) is not limited to a configuration in which the ball screw device 1 is supported with the axis thereof oriented in the vertical direction and may be a configuration in which the ball screw device 1 is supported with the axis thereof oriented in a horizontal direction.

REFERENCE SIGNS LIST

1: ball screw device
10: screw shaft
11: first thread groove
15: exposed portion
20, 20A: nut
21: second thread groove
22: rolling path
24: piece
30: ball
31: infinite circulation path
100, 100A: grease filling device for ball screw device
110: support unit
120: base
130: support base
140: nut holding portion
200: rotation mechanism (grease transfer unit)
300: drive unit (grease transfer unit)
400: grease supply unit
401: grease reservoir
402: nozzle
403: discharge port
500: sleeve (covering member)
503: small diameter portion
600: sleeve movement mechanism (grease transfer unit)
G: grease
S: gap

The invention claimed is:

1. A grease filling method for a ball screw device which applies grease to an infinite circulation path of a nut in a ball screw device including a screw shaft with a first thread groove formed on an outer peripheral surface, the nut placed around the screw shaft and having a second thread groove formed on an inner peripheral surface, a plurality of balls arranged in a rolling path between the first thread groove and the second thread groove, and the infinite circulation path which returns the ball from one part of the rolling path to another part, the method comprising the steps of:
covering an outer periphery of the screw shaft protruding from one end portion of the nut with a covering member;
supplying the grease to a gap between a nut inner peripheral surface on one end side of the nut and the screw shaft;
inserting the protruding screw shaft into a nut inner side while being covered with the covering member by relatively rotating the screw shaft and the nut, bringing a tip of the covering member in an insertion direction closer to an end portion of the infinite circulation path on the one end portion side of the nut, and sending the grease supplied to the nut inner side to a region of the infinite circulation path;
pulling out the covering member together with the screw shaft from the one end portion of the nut by relatively rotating the screw shaft and the nut in a direction opposite to a direction of the relative rotation; and
taking out the covering member from the screw shaft.

2. The grease filling method for the ball screw device according to claim 1, wherein
one end side of the nut is supported by a support via the covering member in the covering step,
grease is pressure-fed toward a nut inner side from the gap in the supplying step,
a tip of the covering member in an insertion direction reaches a position of the infinite circulation path of the nut and the grease supplied to the nut inner side is sent to the infinite circulation path in the sending step,
the covering member is pulled out together with movement of the screw shaft from the one end portion of the nut in the pulling out step, and
the covering member is removed from the screw shaft in the taking out step.

3. The grease filling method for the ball screw device according to claim 2, wherein
the screw shaft is moved with respect to the nut by fixing the nut to the support unit and rotating the screw shaft.

4. The grease filling method for the ball screw device according to claim 2, wherein
the screw shaft is moved with respect to the nut by making the screw shaft supported by the support unit so as to be movable in an axial direction and non-rotatable and rotating the nut.

5. The grease filling method for the ball screw device according to claim 1, wherein
the covering member is a sleeve having a side wall portion thinner than a difference between a maximum radius of the screw shaft and a minimum radius of the nut.

6. The grease filling method for the ball screw device according to claim 1, wherein
at the one end portion of the nut, the grease is pressure-fed from a nozzle whose discharge direction is inclined from a radial direction of the screw shaft toward the nut inner side.

7. The grease filling method for the ball screw device according to claim 6, wherein
the grease is pressure-fed from a plurality of the nozzles provided along a circumferential direction of the screw shaft.

8. The grease filling method for the ball screw device according to claim 6, wherein
the covering member inserted into the nut inner side has a small diameter portion with a diameter-reduced outer peripheral surface in a region from a position facing a discharge port of the nozzle to the tip in the insertion direction and the grease is supplied to the nut inner side through the small diameter portion.

9. The grease filling method for the ball screw device according to claim 1, wherein
the covering member has a bottomed tubular shape.

10. A grease filling device for a ball screw device, in a ball screw device including a screw shaft with a first thread groove formed on an outer peripheral surface, a nut placed around the screw shaft and having a second thread groove formed on an inner peripheral surface, a plurality of balls arranged in a rolling path between the first thread groove and the second thread groove, and an infinite circulation path which returns the ball from one part of the rolling path to another part, the device comprising:
a covering member that covers an outer periphery of the screw shaft protruding from one end portion of the nut;
a grease supply unit that supplies grease to a gap between a nut inner peripheral surface on one end side of the nut and the screw shaft; and
a grease transfer unit that inserts the protruding screw shaft into a nut inner side while being covered with the covering member by relatively rotating the screw shaft and the nut, brings a tip of the covering member in an insertion direction closer to an end portion of the infinite circulation path on the one end portion side of the nut, and transfers the grease supplied to the nut inner side to a region of the infinite circulation path, wherein
the grease transfer unit pulls out the covering member together with the screw shaft from the one end portion of the nut by relatively rotating the screw shaft and the nut in a direction opposite to a direction of the relative rotation and takes out the covering member from the screw shaft.

11. The grease filling device for the ball screw device according to claim 10, wherein
the support unit supports the one end portion of the nut via the covering member;
the grease supply unit pressure-feeds the grease to the gap between the nut inner peripheral surface on one end side of the nut and the screw shaft;
the grease transfer unit moves the covering member along an axial direction together with the screw shaft in synchronization with rotation by a rotation mechanism which relatively rotates the screw shaft and the nut and transfers the grease pressure-fed to the gap to the infinite circulation path of the nut; and the covering member is removed from the screw shaft when the ball screw device is taken out from the support unit.

12. The grease filling device for the ball screw device according to claim 11, wherein
the grease transfer unit includes,
a function of relatively rotating the screw shaft and the nut by the rotation mechanism, moving the protruding screw shaft to the nut inner side while being covered with the covering member, making a tip of the covering member in an insertion direction reach a position of the infinite circulation path of the nut, and sending the grease supplied to the nut inner side to the infinite circulation path, and
a function of relatively rotating the screw shaft and the nut in a direction opposite to a direction of the relative rotation by the rotation mechanism and moving the covering member in a direction of coming out of the one end portion of the nut in synchronization with the movement of the screw shaft.

13. A ball screw device comprising:
a screw shaft with a first thread groove formed on an outer peripheral surface;
a nut consisting of a single piece of homogenous material placed around the screw shaft and having a second thread groove formed on an inner peripheral surface;
a plurality of balls arranged in a rolling path between the first thread groove and the second thread groove; and
an infinite circulation path that returns the ball from one part of the rolling path to another part, wherein
grease is applied to the infinite circulation path of the nut,
the grease is not attached to an exposed portion of the screw shaft protruding from the nut, and
a region on an inner peripheral surface of the nut where the second thread groove is not formed forms a circumferential surface that is not in contact with a ball.

14. A method for manufacturing a ball screw device which supplies the grease to the infinite circulation path by the grease filling method for the ball screw device according to claim 1.

15. A method for manufacturing a linear actuator by using the ball screw device manufactured by the method for manufacturing the ball screw device according to claim 14.

16. A method for manufacturing a vehicle brake by using the ball screw device manufactured by the method for manufacturing the ball screw device according to claim 14.

17. A method for manufacturing a vehicle by using the ball screw device manufactured by the method for manufacturing the ball screw device according to claim 14.

* * * * *